US012634685B2

(12) United States Patent
Elshafie et al.

(10) Patent No.: US 12,634,685 B2
(45) Date of Patent: May 19, 2026

(54) TECHNIQUES FOR ENABLING SECURE COMMUNICATIONS OR ENERGY TRANSFER OPERATIONS

(71) Applicant: QUALCOMM INCORPORATED, San Diego, CA (US)

(72) Inventors: Ahmed Elshafie, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 18/570,939

(22) PCT Filed: Aug. 12, 2022

(86) PCT No.: PCT/US2022/074940
§ 371 (c)(1),
(2) Date: Dec. 15, 2023

(87) PCT Pub. No.: WO2023/023472
PCT Pub. Date: Feb. 23, 2023

(65) Prior Publication Data
US 2024/0323678 A1      Sep. 26, 2024

(30) Foreign Application Priority Data
Aug. 19, 2021      (GR) .............................. 20210100562

(51) Int. Cl.
*H02J 50/00*          (2016.01)
*H02J 50/20*          (2016.01)
(Continued)

(52) U.S. Cl.
CPC ......... *H04W 12/041* (2021.01); *H04W 48/08* (2013.01)

(58) Field of Classification Search
CPC .............. H04W 12/041; H04W 48/08; H04W 12/0431; H04W 8/24; H04W 72/231;
(Continued)

(56) References Cited

U.S. PATENT DOCUMENTS 10,716,002 B2 * 7/2020 Rajadurai ............. H04W 12/06
12,219,554 B2 * 2/2025 Balasubramanian ........................
H04W 72/1268
(Continued)

FOREIGN PATENT DOCUMENTS

WO      WO-2020236664 A1      11/2020

OTHER PUBLICATIONS

International Search Report and Written Opinion—PCT/US2022/074940—ISA/EPO—Nov. 17, 2022 (2103405WO).
(Continued)

*Primary Examiner* — Andrew Suh
(74) *Attorney, Agent, or Firm* — Paul M. McAdams; Holland & Hart LLP

(57) ABSTRACT

Methods, systems, and devices for wireless communications are described. A user equipment (UE) may transmit a request to a device (e.g., another UE, base station) in wireless communication with the UE, where the request may be for the device to transmit a signal to the UE as part of an energy transfer procedure, a security key generation procedure, or both. The UE may receive, from the device, an indication of at least a frequency range to be used for fulfilling the request, and may receive the signal pursuant to the request and the indicated frequency range. The signal may provide energy for the energy transfer procedure or may be a basis for security key generation during the security key generation procedure.

30 Claims, 16 Drawing Sheets

(51) Int. Cl.

| | |
|---|---|
| *H04L 9/08* | (2006.01) |
| *H04W 8/24* | (2009.01) |
| *H04W 12/041* | (2021.01) |
| *H04W 12/0431* | (2021.01) |
| *H04W 48/08* | (2009.01) |
| *H04W 72/231* | (2023.01) |

(58) Field of Classification Search
    CPC .. H04L 2209/80; H04L 9/0875; H02J 50/001;
                                            H02J 50/20
    See application file for complete search history.

(56)                 References Cited

U.S. PATENT DOCUMENTS

| | | | |
|---|---|---|---|
| 2008/0090572 A1* | 4/2008 | Cha ....................... | H04L 63/068 |
| | | | 455/436 |
| 2015/0303741 A1* | 10/2015 | Malik ................... | H02J 50/001 |
| | | | 307/104 |
| 2017/0338956 A1* | 11/2017 | Badawy .............. | H04W 12/033 |
| 2021/0092593 A1* | 3/2021 | Yunusov ............... | H04L 9/0875 |
| 2021/0226686 A1* | 7/2021 | Cheraghi ............. | H04B 17/318 |
| 2021/0345102 A1* | 11/2021 | Win ....................... | H04W 12/03 |
| 2022/0086847 A1* | 3/2022 | Yang ..................... | H04W 24/10 |

OTHER PUBLICATIONS

Wang P., et al., "Physical Layer Key Generation between Backscatter Devices over Ambient RF Signals", IEEE INFOCOM 2021—IEEE Conference on Computer Communications, IEEE, May 10, 2021, pp. 1-10, XP033946967.

* cited by examiner

Procedure request 210

Communication parameter indication 215

Security key signal 220

200

325

Energy harvesting procedure 305-a 305-b 115-d 105-b 115-e 305-c 110-b

▨ Procedure request 310

▩ Communication parameter indication 315

▦ Charging signal 320

300

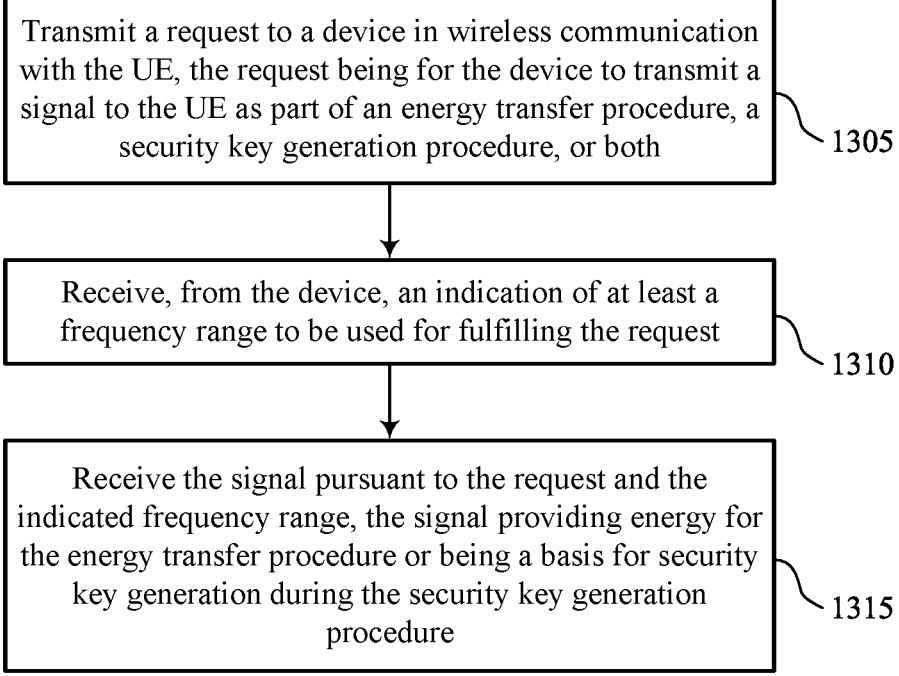

Transmit a request to a device in wireless communication with the UE, the request being for the device to transmit a signal to the UE as part of an energy transfer procedure, a security key generation procedure, or both

1305

Receive, from the device, an indication of at least a frequency range to be used for fulfilling the request

1310

Receive the signal pursuant to the request and the indicated frequency range, the signal providing energy for the energy transfer procedure or being a basis for security key generation during the security key generation procedure

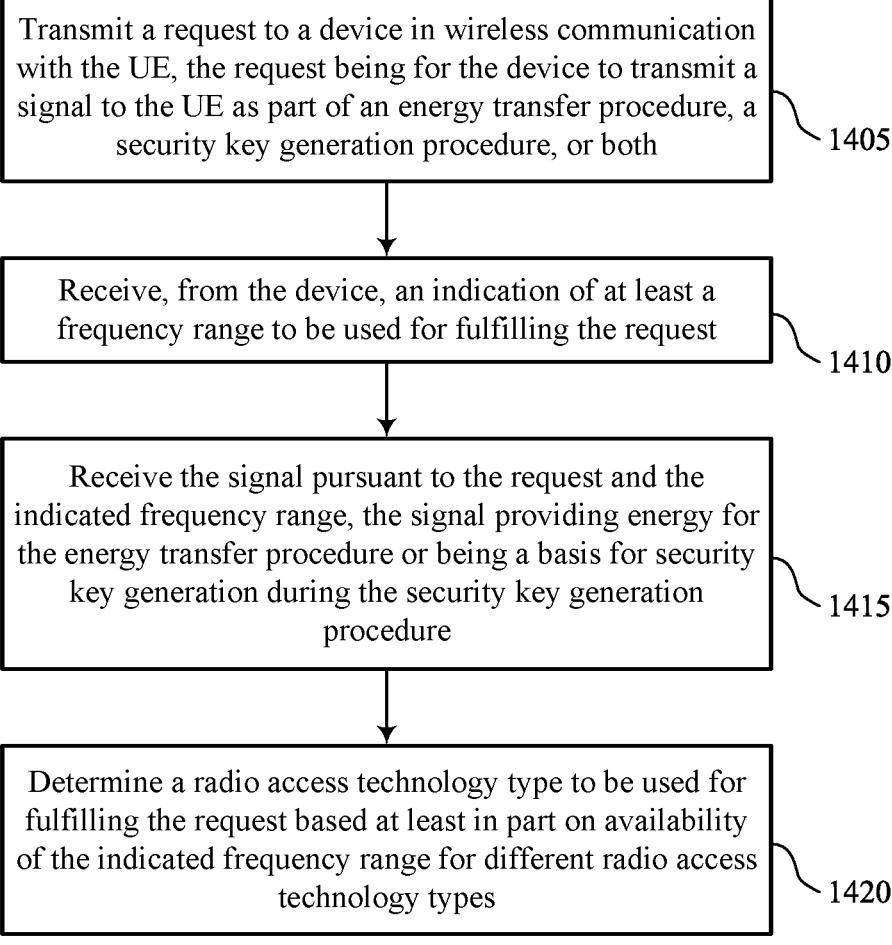

Transmit a request to a device in wireless communication with the UE, the request being for the device to transmit a signal to the UE as part of an energy transfer procedure, a security key generation procedure, or both

1405

Receive, from the device, an indication of at least a frequency range to be used for fulfilling the request

1410

Receive the signal pursuant to the request and the indicated frequency range, the signal providing energy for the energy transfer procedure or being a basis for security key generation during the security key generation procedure

1415

Determine a radio access technology type to be used for fulfilling the request based at least in part on availability of the indicated frequency range for different radio access technology types

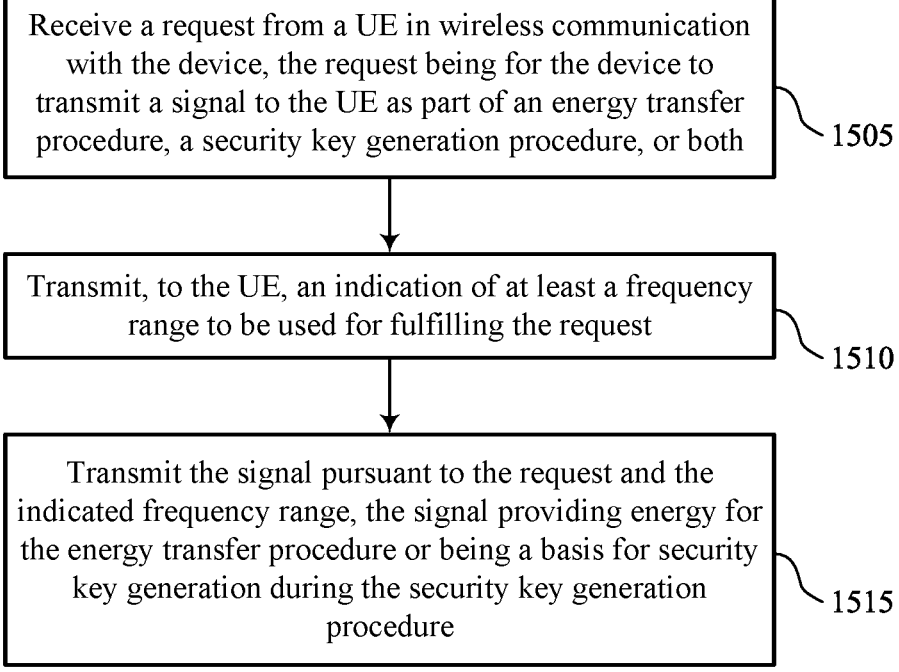

Receive a request from a UE in wireless communication with the device, the request being for the device to transmit a signal to the UE as part of an energy transfer procedure, a security key generation procedure, or both
~1505

Transmit, to the UE, an indication of at least a frequency range to be used for fulfilling the request
~1510

Transmit the signal pursuant to the request and the indicated frequency range, the signal providing energy for the energy transfer procedure or being a basis for security key generation during the security key generation procedure
~1515

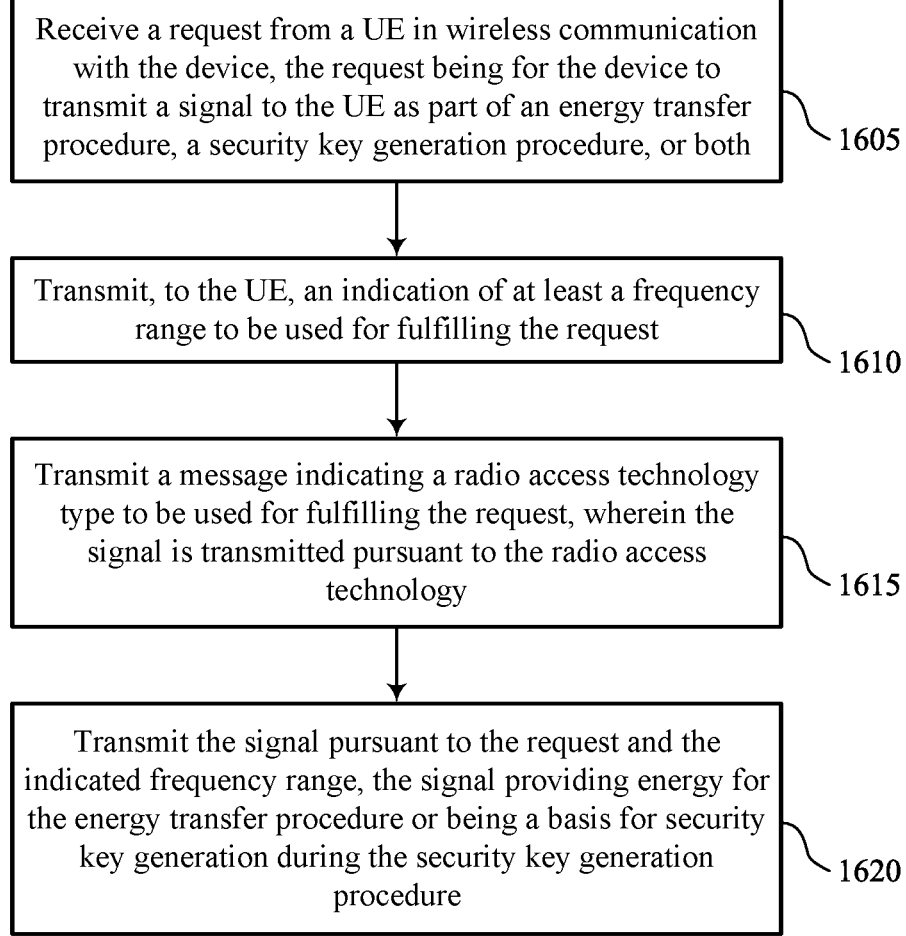

Receive a request from a UE in wireless communication with the device, the request being for the device to transmit a signal to the UE as part of an energy transfer procedure, a security key generation procedure, or both

1605

Transmit, to the UE, an indication of at least a frequency range to be used for fulfilling the request

1610

Transmit a message indicating a radio access technology type to be used for fulfilling the request, wherein the signal is transmitted pursuant to the radio access technology

1615

Transmit the signal pursuant to the request and the indicated frequency range, the signal providing energy for the energy transfer procedure or being a basis for security key generation during the security key generation procedure

TECHNIQUES FOR ENABLING SECURE COMMUNICATIONS OR ENERGY TRANSFER OPERATIONS

CROSS REFERENCES

The present application is a 371 national stage filing of International PCT Application No. PCT/US2022/074940 by Elshafie et al. entitled "TECHNIQUES FOR ENABLING SECURE COMMUNICATIONS OR ENERGY TRANS-FER OPERATIONS," filed Aug. 12, 2022; and claims priority to Greek Patent Application No. 20210100562 by Elshafie et al. entitled "TECHNIQUES FOR ENABLING SECURE COMMUNICATIONS OR ENERGY TRANS-FER OPERATIONS," filed Aug. 19, 2021, each of which is assigned to the assignee hereof, and each of which is expressly incorporated by reference in its entirety herein.

TECHNICAL FIELD

The following relates to wireless communications, including techniques for enabling secure communications or energy transfer operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a device may be configured to harvest energy from one or more received signals, where the device may use the harvested energy to perform one or more tasks. Additionally or alternatively, a device may perform a security key determination procedure with one or more other devices to use for secure communications between the device and the one or more other devices. Techniques for performing an energy harvesting procedure, or security key determination procedure, or both may be improved

SUMMARY

The described techniques relate to improved methods, systems, devices, and apparatuses that support techniques for enabling secure communications or energy transfer operations. Generally, the described techniques provide for improved methods of scheduling resources for performing a security key determination procedure, or an energy harvesting procedure, or both. For example, a UE may transmit a request to a device (e.g., another UE, base station) in wireless communication with the UE, where the request may be for the device to transmit a signal to the UE as part of an energy transfer procedure, a security key generation procedure, or both. The UE may receive, from the device, an indication of at least a frequency range to be used for fulfilling the request, and may receive the signal pursuant to the request and the indicated frequency range. The signal may provide energy for the energy transfer procedure or may be a basis for security key generation during the security key generation procedure.

A method for wireless communications at a UE is described. The method may include transmitting a request to a device in wireless communication with the UE, the request being for the device to transmit a signal to the UE as part of an energy transfer procedure, a security key generation procedure, or both, receiving, from the device, an indication of at least a frequency range to be used for fulfilling the request, and receiving the signal pursuant to the request and the indicated frequency range, the signal providing energy for the energy transfer procedure or being a basis for security key generation during the security key generation procedure.

An apparatus for wireless communications at a UE is described. The apparatus may include at least one processor, memory coupled with the at least one processor, and instructions stored in the memory. The instructions may be executable by the at least one processor to cause the apparatus to transmit a request to a device in wireless communication with the UE, the request being for the device to transmit a signal to the UE as part of an energy transfer procedure, a security key generation procedure, or both, receive, from the device, an indication of at least a frequency range to be used for fulfilling the request, and receive the signal pursuant to the request and the indicated frequency range, the signal providing energy for the energy transfer procedure or being a basis for security key generation during the security key generation procedure.

Another apparatus for wireless communications at a UE is described. The apparatus may include means for transmitting a request to a device in wireless communication with the UE, the request being for the device to transmit a signal to the UE as part of an energy transfer procedure, a security key generation procedure, or both, means for receiving, from the device, an indication of at least a frequency range to be used for fulfilling the request, and means for receiving the signal pursuant to the request and the indicated frequency range, the signal providing energy for the energy transfer procedure or being a basis for security key generation during the security key generation procedure.

A non-transitory computer-readable medium storing code for wireless communications at a UE is described. The code may include instructions executable by at least one processor to transmit a request to a device in wireless communication with the UE, the request being for the device to transmit a signal to the UE as part of an energy transfer procedure, a security key generation procedure, or both, receive, from the device, an indication of at least a frequency range to be used for fulfilling the request, and receive the signal pursuant to the request and the indicated frequency range, the signal providing energy for the energy transfer procedure or being a basis for security key generation during the security key generation procedure.

Some examples of the method, apparatuses, and non-transitory computer-readable medium described herein may further include operations, features, means, or instructions for receiving a message indicating a radio access technology type to be used for fulfilling the request, where the signal may be received pursuant to the radio access technology type.

Some examples of the method, apparatuses, and non-transitory computer-readable medium described herein may further include operations, features, means, or instructions for transmitting a capability message indicating one or more supported radio access technology types that the UE supports, where the radio access technology indicated by the message may be one of the one or more supported radio access technology types.

Some examples of the method, apparatuses, and non-transitory computer-readable medium described herein may further include operations, features, means, or instructions for identifying an ordered list of radio access technology types, the ordered list of radio access technology types including a set of multiple radio access technology types ordered based on an ability of each radio access technology type of the set of multiple the radio access technology types to support the energy transfer procedure, the security key generation procedure, or both.

In some examples of the method, apparatuses, and non-transitory computer-readable medium described herein, receiving the message indicating the radio access technology type to be used for fulfilling the request may include operations, features, means, or instructions for receiving, in the message, an indication of one or more radio access technology types included in the ordered listed of radio access technology types associated with the security key generation procedure, or one or more radio access technology types included in the ordered listed of radio access technology types associated with the energy transfer procedure, or both and determining the radio access technology type from the ordered list of radio access technology types to be used for fulfilling the request based at least on part on the requested procedure.

Some examples of the method, apparatuses, and non-transitory computer-readable medium described herein may further include operations, features, means, or instructions for determining a radio access technology type to be used for fulfilling the request based on availability of the indicated frequency range for different radio access technology types.

Some examples of the method, apparatuses, and non-transitory computer-readable medium described herein may further include operations, features, means, or instructions for receiving a message indicating a bandwidth part to be used for fulfilling the request, the bandwidth part included in the frequency range and receiving the signal pursuant to the request and the bandwidth part, the signal providing energy for the energy transfer procedure or being the basis for security key generation during the security key generation procedure.

Some examples of the method, apparatuses, and non-transitory computer-readable medium described herein may further include operations, features, means, or instructions for transmitting a capability message indicating one or more frequency ranges that the UE supports, where the indicated frequency range may be one of the one or more frequency ranges supported by the UE.

Some examples of the method, apparatuses, and non-transitory computer-readable medium described herein may further include operations, features, means, or instructions for identifying an ordered list of frequency ranges, the ordered list of frequency ranges including a set of multiple frequency ranges ordered based on an ability of each frequency range of the set of multiple frequency ranges to support the energy transfer procedure, the security key generation procedure, or both.

In some examples of the method, apparatuses, and non-transitory computer-readable medium described herein, receiving the indication of at least the frequency range may include operations, features, means, or instructions for receiving a message indicating a first set of frequency ranges included in the ordered list of frequency ranges associated with the security key generation procedure, or a second set of frequency ranges included in the ordered list of frequency ranges associated with the energy transfer procedure and determining the frequency range from the ordered list of frequency ranges to be used for fulfilling the request based at least on part on the requested procedure.

Some examples of the method, apparatuses, and non-transitory computer-readable medium described herein may further include operations, features, means, or instructions for identifying a switching pattern, the switching pattern indicating a pattern for switching between frequency ranges, radio access technology types, bandwidth parts, or a combination thereof and switching between the frequency ranges, the radio access technology types, the bandwidth parts, or a combination thereof, in accordance with the switching pattern to perform the requested procedure.

In some examples of the method, apparatuses, and non-transitory computer-readable medium described herein, the switching pattern switches between the frequency ranges, the radio access technology types, the bandwidth parts, or a combination thereof in accordance with a switching duration.

Some examples of the method, apparatuses, and non-transitory computer-readable medium described herein may further include operations, features, means, or instructions for transmitting a capability of the UE to switch between the radio access technology types, the bandwidth parts, or a combination thereof, where the switching duration may be based on the capability of the UE, the device, or both.

Some examples of the method, apparatuses, and non-transitory computer-readable medium described herein may further include operations, features, means, or instructions for receiving a message indicating the switching duration, the message being a radio resource control message, or a medium access control element message.

In some examples of the method, apparatuses, and non-transitory computer-readable medium described herein, receiving the indication of at least the frequency range may include operations, features, means, or instructions for receiving a radio resource control message, or medium access control element message, of both including the indication of at least of the frequency range to be used for fulfilling the request.

In some examples of the method, apparatuses, and non-transitory computer-readable medium described herein, receiving the signal may include operations, features, means, or instructions for receiving a first reference signal as part of a security key generation procedure pursuant to the request and the indicated frequency range, where the first reference signal may be the signal, transmitting a second reference signal as part of the security key generation procedure, and determining a security key to be applied to one or more messages based on the first reference signal and the second reference signal.

In some examples of the method, apparatuses, and non-transitory computer-readable medium described herein, receiving the signal may include operations, features, means, or instructions for receiving a charging signal as part of the energy transfer procedure pursuant to the request and the indicated frequency range and harvesting the energy from the charging signal.

In some examples of the method, apparatuses, and non-transitory computer-readable medium described herein, the device may be one of a base station or an additional UE.

A method for wireless communications at a device is described. The method may include receiving a request from a UE in wireless communication with the device, the request being for the device to transmit a signal to the UE as part of an energy transfer procedure, a security key generation procedure, or both, transmitting, to the UE, an indication of at least a frequency range to be used for fulfilling the request, and transmitting the signal pursuant to the request and the indicated frequency range, the signal providing energy for the energy transfer procedure or being a basis for security key generation during the security key generation procedure.

An apparatus for wireless communications at a device is described. The apparatus may include at least one processor, memory coupled with the at least one processor, and instructions stored in the memory. The instructions may be executable by the at least one processor to cause the apparatus to receive a request from a UE in wireless communication with the device, the request being for the device to transmit a signal to the UE as part of an energy transfer procedure, a security key generation procedure, or both, transmit, to the UE, an indication of at least a frequency range to be used for fulfilling the request, and transmit the signal pursuant to the request and the indicated frequency range, the signal providing energy for the energy transfer procedure or being a basis for security key generation during the security key generation procedure.

Another apparatus for wireless communications at a device is described. The apparatus may include means for receiving a request from a UE in wireless communication with the device, the request being for the device to transmit a signal to the UE as part of an energy transfer procedure, a security key generation procedure, or both, means for transmitting, to the UE, an indication of at least a frequency range to be used for fulfilling the request, and means for transmitting the signal pursuant to the request and the indicated frequency range, the signal providing energy for the energy transfer procedure or being a basis for security key generation during the security key generation procedure.

A non-transitory computer-readable medium storing code for wireless communications at a device is described. The code may include instructions executable by at least one processor to receive a request from a UE in wireless communication with the device, the request being for the device to transmit a signal to the UE as part of an energy transfer procedure, a security key generation procedure, or both, transmit, to the UE, an indication of at least a frequency range to be used for fulfilling the request, and transmit the signal pursuant to the request and the indicated frequency range, the signal providing energy for the energy transfer procedure or being a basis for security key generation during the security key generation procedure.

Some examples of the method, apparatuses, and non-transitory computer-readable medium described herein may further include operations, features, means, or instructions for transmitting a message indicating a radio access technology type to be used for fulfilling the request, where the signal may be transmitted pursuant to the radio access technology.

Some examples of the method, apparatuses, and non-transitory computer-readable medium described herein may further include operations, features, means, or instructions for receiving a capability message indicating one or more supported radio access technology types that the UE supports, where the radio access technology indicated by the message may be one of the one or more supported radio access technology types.

Some examples of the method, apparatuses, and non-transitory computer-readable medium described herein may further include operations, features, means, or instructions for identifying an ordered list of radio access technology types, the ordered list of radio access technology types including a set of multiple radio access technology types ordered based on an ability of each radio access technology type of the set of multiple the radio access technology types to support the energy transfer procedure, the security key generation procedure, or both.

In some examples of the method, apparatuses, and non-transitory computer-readable medium described herein, transmitting the message indicating the radio access technology to be used for fulfilling the request may include operations, features, means, or instructions for transmitting, in the message, an indication of one or more radio access technology types included in the ordered listed of radio access technology types associated with the security key generation procedure, or one or more radio access technology types included in the ordered listed of radio access technology types associated with the energy transfer procedure, or both and determining the radio access technology type from the ordered list of radio access technology types to be used for fulfilling the request based at least on part on the requested procedure.

Some examples of the method, apparatuses, and non-transitory computer-readable medium described herein may further include operations, features, means, or instructions for determining a radio access technology type to be used for fulfilling the request based on availability of the indicated frequency range for different radio access technology types.

Some examples of the method, apparatuses, and non-transitory computer-readable medium described herein may further include operations, features, means, or instructions for transmitting a message indicating a bandwidth part to be used for fulfilling the request, the bandwidth part included in the frequency range and transmitting the signal pursuant to the request and the bandwidth part, the signal providing energy for the energy transfer procedure or being the basis for security key generation during the security key generation procedure.

Some examples of the method, apparatuses, and non-transitory computer-readable medium described herein may further include operations, features, means, or instructions for receiving a capability message indicating one or more frequency ranges that the UE supports, where the indicated frequency range may be one of the one or more supported frequency ranges.

Some examples of the method, apparatuses, and non-transitory computer-readable medium described herein may further include operations, features, means, or instructions for identifying an ordered list of frequency ranges, the ordered list of frequency ranges including a set of multiple frequency ranges ordered based on an ability of each frequency range of the set of multiple frequency ranges to support the energy transfer procedure, the security key generation procedure, or both.

In some examples of the method, apparatuses, and non-transitory computer-readable medium described herein, transmitting the indication of at least the frequency range may include operations, features, means, or instructions for transmitting a message indicating a first set of frequency ranges included in the ordered list of frequency ranges associated with the security key generation procedure, or a second set of frequency ranges included in the ordered list of frequency ranges associated with the energy transfer procedure and determining the frequency range from the ordered list of frequency ranges to be used for fulfilling the request based at least on part on the requested procedure.

Some examples of the method, apparatuses, and non-transitory computer-readable medium described herein may further include operations, features, means, or instructions for identifying a switching pattern, the switching pattern indicating a pattern for switching between frequency ranges, radio access technology types, bandwidth parts, or a combination thereof and switching between the frequency ranges, the radio access technology types, the bandwidth parts, or a combination thereof, in accordance with the switching pattern to perform the requested procedure.

BRIEF DESCRIPTION OF THE DRAWINGS

FIGS. 13 through 16 show flowcharts illustrating methods that support techniques for enabling secure communications or energy transfer operations in accordance with aspects of the present disclosure.

DETAILED DESCRIPTION

Figure 1:
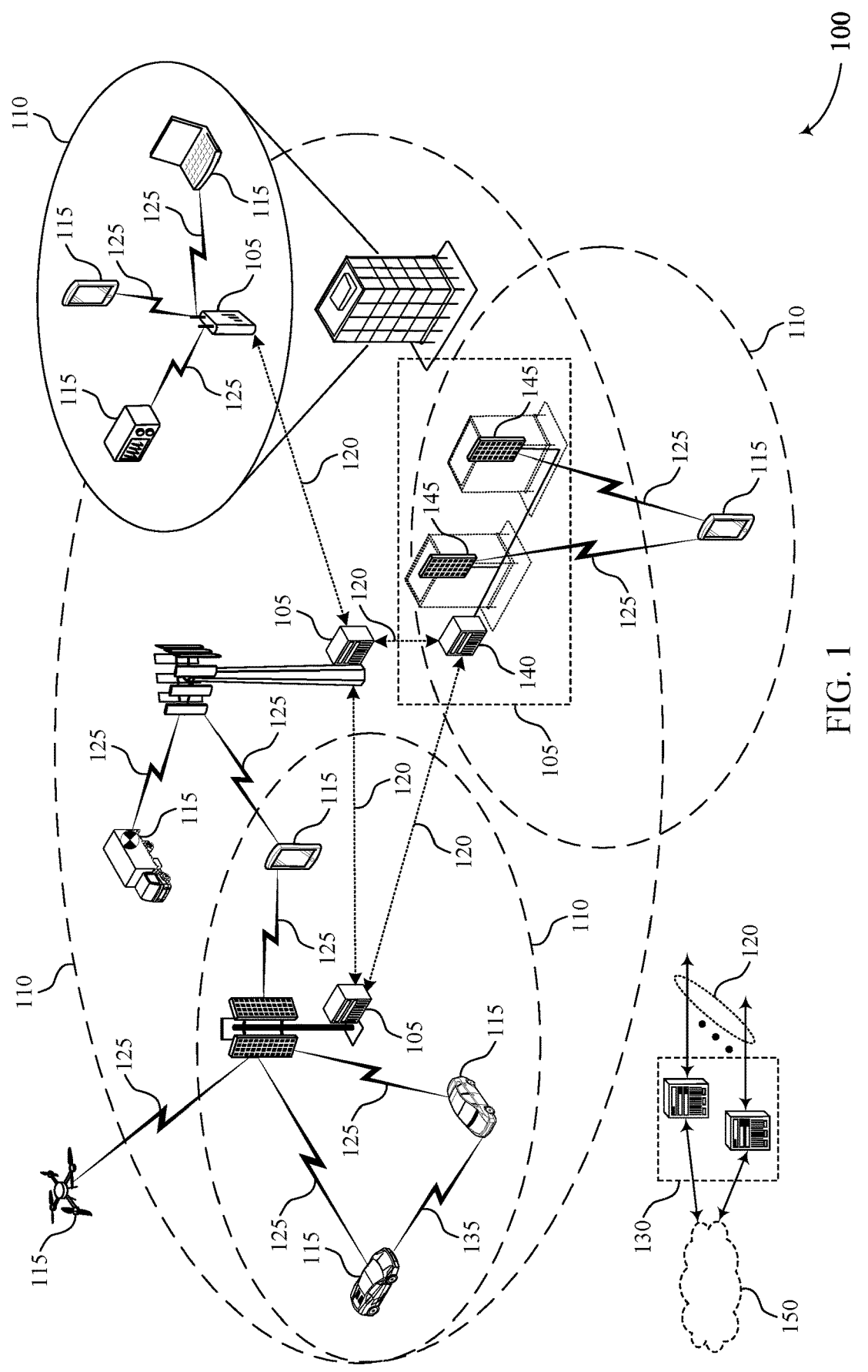
FIG. 1 illustrates an example of a wireless communications system that supports techniques for enabling secure communications or energy transfer operations in accordance with aspects of the present disclosure.

In some wireless communications systems, a user equipment (UE) may perform a security key determination (e.g., generation) procedure with another device (e.g., a UE, base station). In some cases, the UE may determine a security key to use by transmitting and receiving reference signals to and from the other device, respectively, where the security key may be based on the channel over which the reference signals were transmitted and received. The UE, the other device, or both may use the security key to secure communications between the UE and the other device. As the security key is based on a specific channel between the UE and the other device, the narrower (e.g., more directed) the communication beam over which the reference signals are transmitted, the less likely an unintended receiver (e.g., an eavesdropper) may determine the security key being used by the UE and other device, and thus the less likely the unintended receiver will be able to decode the secure transmission. Accordingly, the higher the frequency over which the reference signals and/or communications are transmitted, the more secure the security key and communications may be.

In some wireless communications systems, a device, such as a UE or base station, may be able to harvest energy from received signals (e.g., such as signals from another UE, or base station). For example, a UE may use harvested energy to perform one or more tasks, where the UE may conserve battery of the UE by using the harvested energy to perform the tasks. In some cases, the UE may determine that the UE has insufficient battery remaining to perform one or more tasks, and as such, the UE may harvest energy to perform the one or more tasks. In some examples, the UE may charge the battery of the UE with the harvested energy. In some cases, the lower the path loss of the signal, the more energy the device may be able to harvest from the signal. As path loss decreases with decreasing frequency, the lower the frequency used to transmit the signal, the more energy the device may harvest from the signal. Accordingly, high frequencies may be preferred for the purposes of security key determination and use, and low frequencies may be preferred for the purposes of energy harvesting.

To efficiently configure a device with the appropriate resources for performing security determination or energy harvesting, a device, such as a UE, may be configured to transmit a message to a base station requesting to perform a security key generation procedure or an energy harvesting procedure. In response, the base station may determine one or more parameters to be used by the UE for performing the requested procedure, such as a communication type (e.g., UU communications, sidelink communications, Wi-Fi, Bluetooth), a frequency range (e.g., LTE, FR2, FR4), or a bandwidth part. Accordingly, the base station may determine the one or more parameters based on the requested procedure. For example, the base station may select a high frequency range (e.g., FR4) to be used by the UE if the UE requested a security key generation procedure. Alternatively, the base station may determine a low frequency range (e.g., LTE) to be used by the UE if the UE requested an energy harvesting procedure. In some cases, the base station may determine the one or more parameters based on a preconfigured list of parameters that the UE and base station support, or based on an ordered list of parameters, or both. The base station may transmit an indication of the one or more communication parameters to the UE. The UE may receive the indication and perform either the energy harvesting procedure or the security key generation procedure based on the request and in accordance with the one or more communication parameters.

Particular aspects of the subject matter described herein may be implemented to realize one or more advantages. The described techniques may support improvements in configuring a device (e.g., UE, base station) with resources for performing security key determination, or energy harvesting, or both. The described techniques may decrease latency, improve coordination between devices, improve reliability in a security key determination procedure, energy harvesting procedure, or both, among other advantages. As such, supported techniques may include improved network operations and, in some examples, may promote network efficiencies, among other benefits.

Aspects of the disclosure are initially described in the context of wireless communications systems. Aspects are then described with reference to a process flow. Aspects of the disclosure are further illustrated by and described with reference to apparatus diagrams, system diagrams, and flowcharts that relate to techniques for enabling secure communications or energy transfer operations.

FIG. 1 illustrates an example of a wireless communications system 100 that supports techniques for enabling secure communications or energy transfer operations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a personal computer a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

One or more numerologies for a carrier may be supported, where a numerology may include a subcarrier spacing ($\Delta f$)

and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below: 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming.

The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A UE 115 may transmit a request to a device (e.g., another UE 115, base station 105) in wireless communication with the UE 115, where the request may be for the device to transmit a signal to the UE 115 as part of an energy transfer procedure, a security key generation procedure, or both. The UE 115 may receive, from the device, an indication of at least a frequency range to be used for fulfilling the request, and the UE 115 may receive the signal pursuant to the request and the indicated frequency range. The signal may provide energy for the energy transfer procedure or may be a basis for security key generation during the security key generation procedure.

Figure 2:
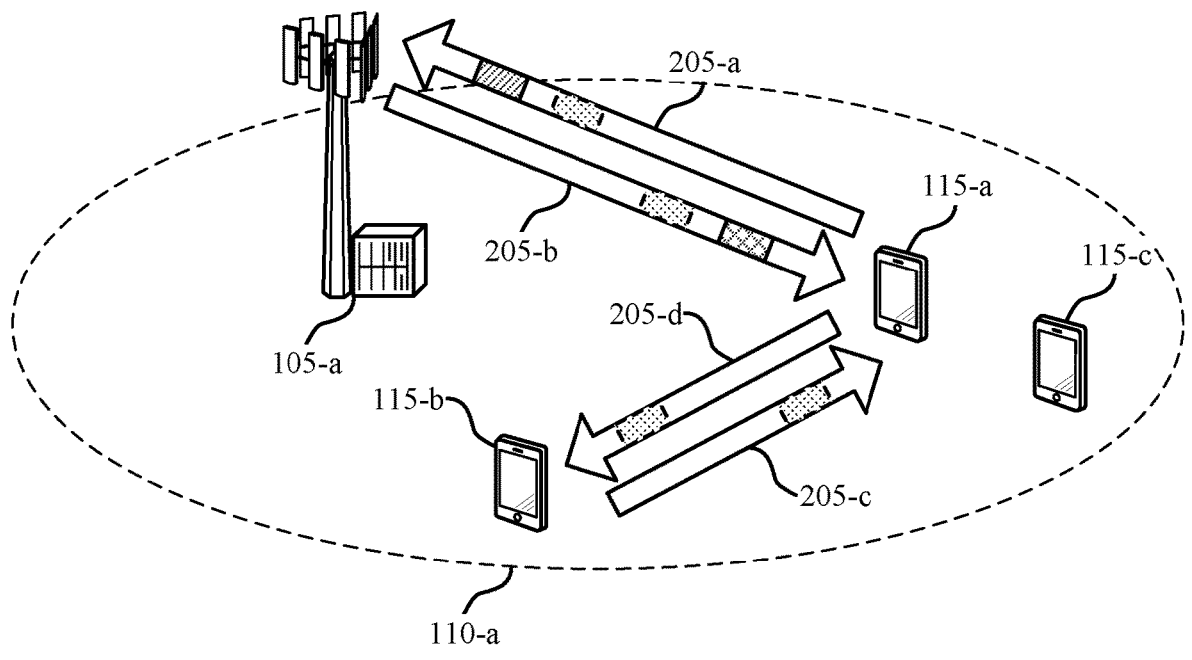
FIG. 2 illustrates an example of a wireless communications system that supports techniques for enabling secure communications or energy transfer operations in accordance with aspects of the present disclosure.

FIG. 2 illustrates an example of a wireless communications system 200 that supports techniques for enabling secure communications or energy transfer operations in accordance with aspects of the present disclosure. The wireless communications system 200 may include base station 105-a and UEs 115-a, 115-b, and 115-c, which may be examples of a base station 105 and UEs 115 as described with reference to FIG. 1. Base station 105-a may serve a geographic coverage area 110-a. In some cases, UE 115-a may implement a security key determination procedure with base station 105-a, or UE 115-b, or both based on a request transmitted by UE 115-a to base station 105-a, UE 115-b, or both. Additionally or alternatively, other wireless devices, such as base station 105-a, may perform the same or similar procedure.

Base station 105-a may serve UE 115-a, UE 115-b, UE 115-c, or a combination thereof. For example, UE 115-a and base station 105-a may communicate via communication links 205 (e.g., beams, channels). UE 115-a may transmit one or more messages (e.g., control messages, data messages) to base station 105-a via communication link 205-a (e.g., an uplink communication link) and base station 105-a may transmit one or more messages (e.g., control messages, data messages) to UE 115-a via communication link 205-b (e.g., a downlink communication link). In some cases, UE 115-a may communicate with one or more other devices, such as UE 115-b. UE 115-a may transmit one or more messages (e.g., control messages, data messages) to UE 115-a via communication link 205-d (e.g., a sidelink communication link) and UE 115-b may transmit one or more messages (e.g., control messages, data messages) to UE 115-a via communication link 205-c (e.g., a sidelink communication link).

In some implementations, a UE 115 may perform a security key determination procedure (e.g., a physical layer security scheme) with another device (e.g., base station 105-a, UE 115-b) to secure communications between the UE 115 and other device. For example, the security key (e.g., a sequence of bits including any number of bits) may be uniquely used for communications between the UE 115 and the other device. Accordingly, the UE 115 may use the security key when communicating with the other device to secure communications with the other device. For example, the UE 115 may identify information (e.g., control information, data information) to transmit to the other device, or vice versa, and the UE 115 may manipulate the information using the security key. As the UE 115 and the other device are the only two devices with the security key being used to manipulate the information, unintended receivers may be unable to decode the information being transmitted.

The UE 115 may determine the security key, the other device may determine the security key, or both. For example, in some cases, the other device may determine the security key and transmit an indication of the security key to the UE 115. In some cases, the UE 115 may determine the security key, and transmit an indication of the security key to the other device. In some cases, the UE 115 and the other device may each determine the security key (e.g., where the UE 115 and the other device may each determine the same security key). For example, UE 115-a and base station 105-a may each determine a security key to be used for communications between UE 115-a and base station 105-a. To do so, UE 115-a may transmit one or more reference signals to base station 105-a via a communication link (e.g., communication link 205-a). Base station 105-a may receive the one or more reference signals and estimate the channel between the UE 115-a and base station 105-a based on the one or more received reference signals. Similarly, base station 105-a may transmit one or more reference signals to UE 115-a via a communication link (e.g., communication link 205-b). UE 115-a may receive the one or more reference signals and estimate the channel between the UE 115-a and base station 105-a based on the one or more received reference signals. The channel estimated by UE 115-a and base station 105-a may be the same or similar if the downlink channel and the uplink channel are reciprocal. Base station 105-*a* and UE 115-*a* may each quantize the channel (e.g., based on a quantization rule, a predetermined rule), where UE 115-*a* and base station 105-*a* may each determine a number of bits (e.g., a security key) based on the quantization. UE 115-*a* and base station 105-*a* may each (individually) determine the same set of bits (e.g., same number and sequence of bits) because the determination was based on the channel between UE 115-*a* and base station 105-*a*.

Upon determining the security key, each device (e.g., UE 115-*a*, base station 105-*a*) may use the security key to secure one or more communications to the other device. Additionally, each device may use the security key to decode one or more communications from the other device. For example, base station 105-*a* may determine to secure downlink control information (DCI) for UE 115-*a*. As such, base station 105-*a* may manipulate the DCI to produce an encoded transmission based on the security key. For example, base station 105-*a* may apply an Exclusive or (XOR) encryption (e.g., or some other encryption type) to the DCI (e.g., DCI bits) with the security key, and base station 105-*a* may transmit the encrypted DCI to UE 115-*a*. In some cases, base station 105-*a* may indicate that the DCI is encrypted, or UE 115-*a* may otherwise determine that the DCI is encrypted. Upon receiving the encrypted DCI, UE 115-*a* may demodulate and/or decode the encrypted DCI, and then XOR the decoded DCI to achieve the original DCI (e.g., original DCI bits).

In some implementations, device may indicate a security key to one or more other devices. In some cases, each device may generate an extended key based on the shared key, such as by using a predetermined rule (e.g., a pseudo-random number generator), where the shared key may be a starting point for determining an extended key based on the rule. In such cases, each device may be configured with the same predetermined rule so that each device may determine the same extended key based on the shared key. For example, devices may secure communications (e.g., control information, data) by sharing secret keys (e.g., between legit parties of the communications), then each device may manipulate (e.g., XOR, one-time pad method) the actual information channel bits with an extended key determined from the shared key based on a predetermine rule.

As such, UE 115-*a* and base station 105-*a* may identify (e.g., determine, generate, calculate) the security key to be used, and the security key may be unknown to unintended receivers (e.g., eavesdroppers) due to the randomness of the channel between UE 115-*a* and base station 105-*a*. For example, the unintended receiver (e.g., UE 115-*c*) may be unable to determine the security key being used by UE 115-*a* and base station 105-*a* because the channel between the UE 115-*c* and UE 115-*a* and/or UE 115-*c* and base station 105-*a* is not the same as the channel between UE 115-*a* and base station 105-*a*. So even if the unintended receiver (e.g., UE 115-*c*) monitors for reference signals being transmitted between UE 115-*a* and base station 105-*a* (e.g., reference signals for determining the security key), the channel between UE 115-*c* and base station 105-*a* and/or UE 115-*a* is different, and as such, the unintended receiver may not be able to determine the key. Such security key generation and usage procedure become more effective at higher frequencies as the beams become more narrow, and the randomness of the channel increases.

As the security key may be based on a specific channel between UE 115-*a* and base station 105-*a*, the narrower (e.g., more directed, more random) the communication beam over which the reference signals are transmitted, the less likely an unintended receiver (e.g., an eavesdropper) may determine the security key associated with the channel between UE 115-*a* and base station 105-*a*, and thus the less likely the unintended receiver will be able to decode a secure message transmitted by UE 115-*a* and/or base station 105-*a*. Additionally, the narrower the communication beam over which the secure communication is transmitted, the less likely an unintended receiver may be able to successfully receive and decode the complete transmission (e.g., even if the unintended receiver determines the security key). Accordingly, the higher the frequency over which the reference signals and/or communications are transmitted, the more secure the security key and communications may be. In some implementations, UE 115-*a* may determine (e.g., receive, determine, generate) a security key to be used for communications with another UE 115, such as UE 115-*b*). In some cases, UE 115-*a* may store multiple security keys, each key associated with a different device.

Figure 3:
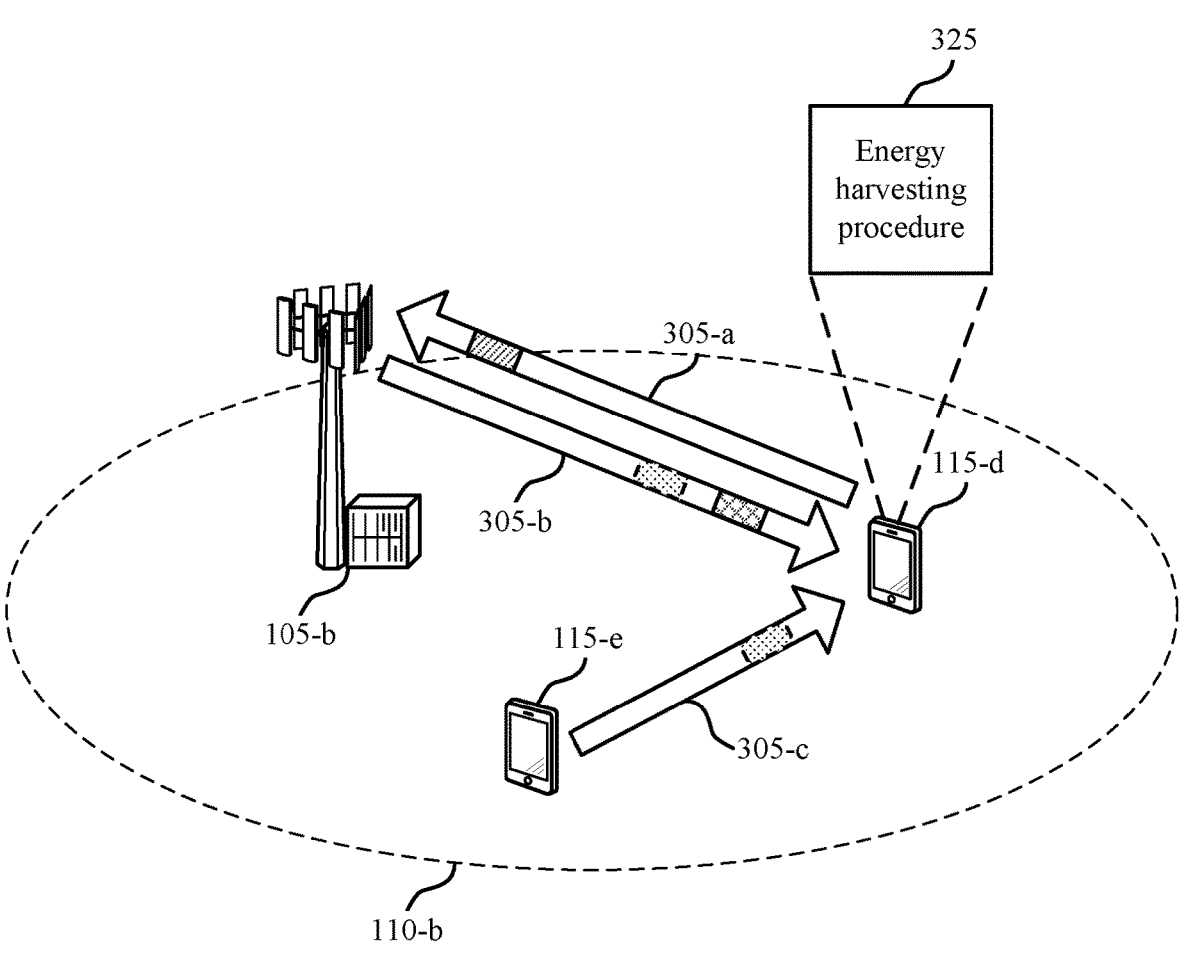
FIG. 3 illustrates an example of a wireless communications system that supports techniques for enabling secure communications or energy transfer operations in accordance with aspects of the present disclosure.

As described in additional detail with reference to FIG. 3, in some cases, a device (e.g., a UE 115, base station 105) may be configured to implement an energy harvesting procedure, where the device may receive one or more signals (e.g., IR signals) and harvest the energy from the signal to perform one or more tasks (e.g., data decoding, data reception, data encoding, data transmission, battery charging). In some cases, the lower the path loss of the signal, the more energy the device may be able to harvest from the signal. Path loss may increase with increasing frequency and increasing distance (e.g., increasing distance the signal travels, or increasing the frequency over which the signal is transmitted, or both may increase losses). As path loss may decrease with decreasing frequency, the lower the frequency used to transmit the signal, the more energy the device may harvest from the signal.

Accordingly, high frequencies may be preferred for the purposes of security key determination and use, and low frequencies may be preferred for the purposes of energy harvesting. Additionally or alternatively, communication type (e.g., technology) may impact a security key determination procedure, energy harvesting procedure or, both, where communication type may refer to a UU communications, sidelink communication, Wi-Fi, or Bluetooth. For example, security key sharing and usage may be more secure for short-range communications (e.g., Bluetooth).

In some cases, a device may support multiple communication types, multiple frequency ranges, or both. For example, a UE 115 may support sidelink communications and UU communications. Additionally or alternatively, the UE 115 may support LTE, FR1, and FR2 frequency ranges, for example. As such, in some cases, the UE 115 may support six communication links (e.g., UU communications in LTE, FR1, and FR2, and sidelink communications in LTE, FR1, and FR2). In some implementations, one or more of the six links may be used to support securing communications, energy harvesting, or both. To schedule a device with appropriate communication parameters, and to enable a device to perform a security key determination procedure, energy harvesting procedure, or both, a device may be configured to transmit a request to a serving device to perform an energy harvest procedure or security key determination procedure. In response, the serving device may determine and indicate one or more communication parameters to be used by the device for performing the requested procedure.

For example, UE 115-*a* may be connected to base station 105-*a*, or establish a connection with base station 105-*a*, and may determine to perform a security key sharing procedure with base station 105-a. Accordingly, UE 115-a may transmit a procedure request 210 to base station 105-a (via communications link 205-a) including a request to perform a security key sharing procedure. In some cases, UE 115-a may scramble the request (e.g., with a secret-key-RNTI). In response, base station 105-a may respond with a communication parameter indication 215 (via communication link 205-b). The communication parameter indication 215 may indicate a frequency (e.g., LTE, FR2, Sub-6, FR2x, FR4), a communication type (e.g., UU communications, sidelink communication, Wi-Fi, Bluetooth), a BWP, or a combination thereof for performing the requested procedure. UE 115-a may perform the requested procedure in accordance with one or more indicated communication parameters.

In one example, the communication parameter indication 215 may indicate a frequency for UE 115-a to use, and a UU communication type. In some cases, the indication may indicate UE 115-a to fulfil the UU communication with base station 105-a. In some cases, UE 115-a may autonomously determine, or be preconfigured to perform UU communications with base station 105-a. In some cases, UE 115-a may determine to perform the UU communication with another device, such as a base station 105 other than base station 105-a. Accordingly, UE 115-a may determine which device to perform the indicated UU communication with and perform the requested procedure with the determined device (e.g., base station 105-a).

In some cases, UE 115-a may perform the requested procedure by determining a security key and transmitting an indication of the security key to base station 105-a (e.g., via a security key signal 220). In some cases, base station 105-a may determine the security key and transmit an indication of the security key to UE 115-a (e.g., via a security key signal 220). In some cases, UE 115-a and base station 105-a may each determine the security key. For example, UE 115-a may transmit one or more reference signals to base station 105-a (e.g., security key signal 220 via communication link 205-a) and base station 105-a may transmit one or more reference signals to UE 115-a (e.g., security key signal 220 via communication link 205-b). UE 115-a and base station 105-a may use the received one or more reference signals, respectively, to determine a security key, where UE 115-a and base station 105-a may each determine the same security key. For example, UE 115-a and base station 105-a may each estimate the channel over which the one or more reference signals were transmitted and obtain the security key based on the estimated channel (e.g., from quantization of a narrow beam channel estimation).

In another example, the communication parameter indication 215 may indicate a frequency for UE 115-a to use, and a sidelink communication type. In some cases, the indication may indicate UE 115-a to fulfill the sidelink communication with UE 115-b. In some cases, UE 115-a may autonomously determine, or be preconfigured to perform sidelink communications with UE 115-b. Accordingly, UE 115-a may determine which device to perform the indicated sidelink communication with and perform the requested procedure with the determined device (e.g., UE 115-b).

In some cases, UE 115-a may perform the requested procedure by determining a security key and transmitting an indication of the security key to UE 115-b (e.g., via a security key signal 220). In some cases, UE 115-b may determine the security key and transmit an indication of the security key to UE 115-a (e.g., via a security key signal 220). In some cases, UE 115-a and UE 115-b may each determine the security key. For example, UE 115-a may transmit one or more reference signals to UE 115-b (e.g., security key signal 220 via communication link 205-d) and UE 115-b may transmit one or more reference signals to UE 115-a (e.g., security key signal 220 via communication link 205-c). UE 115-a and UE 115-b may use the received one or more reference signals, respectively, to determine a security key, where UE 115-a and UE 115-b may each determine the same security key. For example, UE 115-a and UE 115-b may each estimate the channel over which the one or more reference signals were transmitted and obtain the security key based on the estimated channel (e.g., from quantization of a narrow beam channel estimation).

In some implementations, the one or more communication parameters indicated to the UE 115 by the base station 105 may be based on a capability of the UE 115, a capability of the base station 105, a capability of neighboring devices (e.g., UE 115-b), or a combination thereof to support the one or more communication parameters. For example, in some cases, the UE 115 may transmit, to the base station 105, an indication of one or more communications types, one or more frequency ranges, one or more bandwidth parts, or a combination thereof the UE 115 supports (e.g., via radio resource control (RRC), uplink control information (UCI), medium access control (MAC) control element (MAC-CE)). In some cases, the base station 105 may transmit, to the UE 115, an indication of one or more communications types, one or more frequency ranges, one or more bandwidth parts, or a combination thereof the base station supports (e.g., via RRC, UCI, MAC-CE). Accordingly, the base station 105 may select from a set of communications types, frequency ranges, bandwidths parts, or a combination thereof that the UE 115, the base station 105, or both supports and transmit the selected communication parameters to the UE 115.

In some cases, the UE 115 and/or the base station 105 may determine which communication parameters may be used (or are preferred) for security key determination and usage, and which communication parameters may be used (or are preferred) for energy harvesting. In some implementations, the UE 115, the base station 105, or both may determine an ordering of communication types, frequency ranges, bandwidth parts, or a combination thereof. For example, a set of a communication types may be ordered based on preferred use of each communication type for a security key determination procedure, or energy harvesting procedure. Similarly, a set of frequency ranges and/or bandwidth parts may be ordered based on preferred use of each communication type for a security key determination procedure, or energy harvesting procedure. For example, an ordered list of frequency ranges may order the frequency ranges starting with the frequency range that is preferred for energy harvesting (e.g., a low or lowest frequency range) and ending with the frequency range that is preferred for security key determination (e.g., a high or highest frequency range). In some cases, an ordered list of frequency ranges configured in this way may result in the following: LTE, Sub-6, FR2, FR2x, or FR4. In another example, an ordered list of communication types may order the communication types starting with the communication type that is preferred for energy harvesting and ending with the communication type that is preferred for security key determination (e.g., a short range communication type). In some implementations, frequency ranges and communication types may be ordered in the same list. For example, FR2 may be preferred for security key determination, but if FR2 is unavailable or not supported, then Bluetooth may be preferred. In another example, Wi-Fi and LTE (e.g., FR1) may be equally or similarly preferred for energy harvesting and Bluetooth and FR2 may be equally or similarly not preferred for energy harvesting. As such, an order list from energy harvesting to security key determination may include: LTE/Wi-Fi . . . Bluetooth, FR2.

In some implementations, the UE 115 may order the communication types, the frequency ranges, the bandwidth parts, or a combination thereof, and transmit an indication of the one or more ordered lists to the base station 105. In some implementations, the base station 105 may order the communication types, the frequency ranges, the bandwidth parts, or a combination thereof, and transmit an indication of the one or more ordered lists to the UE 115. In some cases, the UE 115 and base station 105 may agree on the ordering of the one or more ordered lists, or determine the lists together. In some cases, the ordering of the one or more ordered lists may be preconfigured, and the UE 115 and base station 105 may determine that one or more ordered lists based on the preconfiguration. The ordering and/or the content of each ordered list may be configured aperiodically, semi-statically, or dynamically.

In some cases, the ordered list may include any communication parameter supported by a network, or may include communication parameters supported by the UE 115, the base station 105, or both. For example, the UE 115 and base station 105 may be communicating in a network, where the network may support UU communications, sidelink communications, Wifi, Bluetooth for communication types, and may support LTE, FR2, and FR4 for frequency ranges. However, the UE 115 and base station 105 may support UU communications, sidelink communications for communication types, and may support LTE for frequency ranges. Accordingly, in some cases, the UE 115, the base station 105, or both, may determine an order of any potential frequency range that is supported by the network, even if the base station 105 and/or UE 115 do not support one or more of the frequency ranges supported by the network. In some other cases, the UE 115, the base station 105, or both, may only order the frequency ranges that are supported by the base station 105 and the UE 115.

The UE 115, base station 105, or both may determine which communication parameters to use based on the one or more ordered lists and the requested procedure. For example, if the UE 115 requests a security key determination procedure, the UE 115 and/or the base station 105 may determine to use the first frequency in the ordered list associated with security key determining (e.g., FR4) to perform the requested procedure in accordance with the ordered list. In some cases, the UE 115 or the base station 105 may determine that UE 115 and/or base station 105 do not support the frequency range (e.g., FR4), or that the frequency range is unavailable, or a combination thereof. Accordingly, the UE 115 and/or the base station 105 may determine to use the next frequency in the ordered list (e.g., FR2x) to perform the requested procedure based on the ordered list, and so on until the UE 115 and/or base station 105 identify an available, supported frequency range to use for the requested procedure in accordance with the order list.

In some cases, the UE 115 and/or the base station 105 may determine a bandwidth part based on an order list of bandwidth parts, or may determine a bandwidth part based on a frequency range. For example, if the UE 115 requests to perform a security key determination procedure and determines that instead of FR4, the UE 115 is to use FR2 (based on availability, or support), then the UE 115 and/or base station 105 may determine to select a high (or highest) bandwidth part that is available in FR2.

In some cases, the UE 115 and/or base station may determine a communication type based on an ordered list of communication types, or may determine a communication type based on a frequency range. In some cases, the UE 115 and/or base station 105 may select the communication type based on the frequency range associated with the communication type. For example, sidelink may be deployed in FR2 and UU may be deployed in FR1. If the UE 115 requests to perform a security key determination procedure, then the UE 115 and/or base station 105 may determine to use sidelink communications because FR2 is a higher frequency range that FR1.

In some implementations, UE 115 may perform a security key determination method in accordance with a switching pattern. For example, the switching pattern may indicate a pattern of communication types, frequency bands, bandwidth parts, or a combination thereof for determining security keys. For example, the switching pattern may indicate that for x units (e.g., slots, symbols, milliseconds, time units, transmissions, occasions) the devices (e.g., a UE 115 and UE 115, a UE 115 and base station 105, a base station 105 and base station 105) determine and use a security key using LTE, then for y units the devices determine and use a security key using FR2, then for z units the devices determine and use a security key using Wifi, where x, y, and z may be the same or different. As such, the devices may dynamically switch communication parameters in accordance with the switching pattern to determine and use a security key. The switching pattern may introduce an additional security feature to protect communications between two devices from eavesdroppers because the eavesdroppers may not know the switching pattern.

In some cases, a new key may be determined and used for each communication parameter switch. For example, the UE 115 and base station 105 may determine and use a first security key for the first set of communication parameters in the switching pattern, and then upon switching communication parameters (in accordance with the pattern, or otherwise), the UE 115 and the base station 105 may determine a second security key. In some implementations, the same key may be used for different communication parameters throughout the switching pattern.

In some cases, the switching pattern may be unique to communications between two devices. For example, a UE 115 and base station 105 may agree on the switching pattern. In some cases, the UE 115 may indicate the switching pattern, a preference of the switching pattern, or a capability to support a switching pattern, to the base station 105, and the base station 105 may acknowledge or change the switching pattern. In some cases, the base station 105 may indicate the switching pattern, a preference of the switching pattern, or a capability to support a switching pattern to the UE 115, and the UE 115 may acknowledge or change the switching pattern. The switching pattern may be defined in RRC, and/or MAC-CE. For example, the order of communication parameters and x, y, and z may be configured in RRC and/or MAC-CE.

FIG. 3 illustrates an example of a wireless communications system 300 that supports techniques for enabling secure communications or energy transfer operations in accordance with aspects of the present disclosure. The wireless communications system 300 may include base station 105-b and UEs 115-d, and 115-e, which may be examples of a base station 105 and UEs 115 as described with reference to FIGS. 1 and 2. Base station 105-b may serve a geographic coverage area 110-b. In some cases, UE 115-d may implement an energy harvesting procedure 325 with base station 105-*b*, or UE 115-*e*, or both based on a request transmitted by UE 115-*d* to base station 105-*b*, UE 115-*e*, or both. Additionally or alternatively, other wireless devices, such as base station 105-*b*, may perform the same or similar procedure.

Base station 105-*b* may serve UE 115-*d*, UE 115-*e*, or both. For example, UE 115-*d* and base station 105-*b* may communicate via communication links 305 (e.g., beams, channels). UE 115-*d* may transmit one or more messages (e.g., control messages, data messages) to base station 105-*b* via communication link 305-*a* (e.g., an uplink communication link) and base station 105-*b* may transmit one or more messages (e.g., control messages, data messages) to UE 115-*d* via communication link 305-*b* (e.g., a downlink communication link). In some cases, UE 115-*d* may communicate with one or more other devices, such as UE 115-*e*. UE 115-*d* may transmit one or more messages (e.g., control messages, data messages) to UE 115-*e* via a communication link (e.g., a sidelink communication link) and UE 115-*e* may transmit one or more messages (e.g., control messages, data messages) to UE 115-*d* via communication link 305-*c* (e.g., a sidelink communication link).

In some implementations, a device, such as UE 115-*d*, may perform an energy harvesting procedure 325 with another device (e.g., base station 105-*b*, UE 115-*e*). To perform an energy harvesting procedure, UE 115 may harvest energy from one or more sources, such as solar (e.g., via photovoltaic energy harvesting), vibration (e.g., via piezoelectric, electrostatic, or electromagnetic energy harvesting), thermal (e.g., via thermoelectric, or pyroelectric energy harvesting), and radio waves, such as radio frequency (RF) (e.g., via signals received through an antenna). In some implementations, a device may perform an energy harvesting procedure to increase battery lifespan of the device (e.g., conserve battery, charge battery). In some implementations, the device may be a battery-less device (e.g., wearable device, medial sensor, implanted sensor, factory sensors, ultra-low power radio sensors) and may perform an energy harvesting procedure to use the harvested energy as an energy source. In some cases, the device may be referred to as a zero-energy device, where the devices energy may be obtained from ambient energy (e.g., light, vibrations, temperature differences, or even radio waves), as described herein, so that the device may perform one or more tasks. For example, the device may harvest energy to perform data decoding, data reception, data encoding, or data transmission.

The amount of energy a device may harvest from an RF signal may depend on the frequency source (e.g., the device from which the signal is originating), the distance between the transmitting device and the receiving device (e.g., distance the signal travels), or receiver power. In some cases, energy harvesting via an RF source may provide controllable and/or constant energy transfer to a receiver device. In some cases, a receiver device may harvest energy from a fixed device (e.g., fixed RF-energy harvesting network), and as such, the harvested energy may be predictable and relatively stable over time due to a fixed distance. In some cases, using a random multipath fading channel model, the energy harvested at node j from a transmitting node i is given by Equation 1, where $P_i$ is the transmit power by node i, $g_{i-j}$ is the channel coefficient of the link between node i and node j, T is the time allocated for energy harvesting, and $\eta$ is the RF-to-DC conversion efficiency.

$$E_j = \eta P_i |g_{i-j}|^2 T \qquad (1)$$

An RF-energy harvesting node (e.g., device) may include a lower power microcontroller to process data, a low-power RF transceiver for information transmission or reception, an energy harvester (e.g., composed of an RF antenna, an impedance matching, a voltage multiplier and a capacitor, to collect RF signals and convert them into electricity), a power management module (e.g., which may determine whether to store the electricity obtained from the RF energy harvester or to use it for information transmission immediately), and an energy storage or battery.

A device may be configured to perform an energy harvesting procedure using a separated receiver architecture, a time-switching architecture, a power-splitting architecture, or some other energy harvesting architecture. For example, a device using a time-switching architecture may use all allocated resources and/or antennas to perform energy harvesting for a first duration and then switch to perform communications (e.g., receive information, transmit information) with all of the allocated resources and/or antennas for a second duration. A time-switching architecture (e.g., a time-switching RF-energy harvesting scheme) may allow the network node to switch between a communication transceiver (e.g., information receiver) and an energy harvester. As such, the device may not perform communications and energy harvesting at the same time.

In an another example, a device using a power-switching architecture may use a subset of resources and/or antennas to perform energy harvesting and a different subset of resources and/or antennas to perform communications (e.g., receive information, transmit information) at the same or overlapping times. To do so, the device may split power capability to perform both energy harvesting and to perform communications. With a power-splitting architecture (e.g., power-splitting RF-energy harvesting scheme), received RF signals may be split into two streams for the information receiver and RF energy harvester with different power levels.

Accordingly, a device, such as UE 115-*d*, may use harvested energy to perform one or more tasks, where UE 115-*a* may conserve battery of UE 115-*d* by using the harvested energy to perform the tasks. In some cases, UE 115-*d* may determine that UE 115-*d* has insufficient battery remaining to perform one or more tasks, and as such, UE 115-*d* may harvest energy to perform the one or more tasks. In some examples, UE 115-*d* may charge the battery of UE 115-*d* with the harvested energy. In either case, UE 115-*d* may receive one or more signals from another device (e.g., base station 105-*b*, UE 115-*e*) and use energy from the received signal to perform one or more tasks.

As described herein, the lower the path loss of the signal, the more energy the device may be able to harvest from the signal. As path loss decreases with decreasing frequency, the lower the frequency used to transmit the signal, the more energy the device may harvest from the signal. Accordingly, high frequencies may be preferred for the purposes of security key determination and use, and low frequencies may be preferred for the purposes of energy harvesting. Additionally or alternatively, communication type (e.g., technology) may impact a security key determination procedure, energy harvesting procedure, or both, where communication type may refer to a UU communications, sidelink communication, Wi-Fi, or Bluetooth.

To schedule a device with appropriate communication parameters, and to enable a device to perform a security key determination procedure, energy harvesting procedure, or both, a device may be configured to transmit a request to a serving device to perform an energy harvest procedure or security key determination procedure. In response, the serving device may determine and indicate one or more communication parameters to be used by the device for performing the requested procedure.

For example, UE 115-*d* may be connected to base station 105-*b*, or establish a connection with base station 105-*b*, and may determine to perform an energy harvest procedure 325 with base station 105-*b*. Accordingly, UE 115-*d* may transmit a procedure request 310 to base station 105-*b* (via communications link 305-*a*) including a request to perform an energy harvest procedure. In response, base station 105-*b* may respond with a communication parameter indication 315 (via communication link 305-*b*). The communication parameter indication 315 may indicate a frequency (e.g., LTE, FR2, Sub-6, FR2x, FR4), a communication type (e.g., UU communications, sidelink communication, Wi-Fi, Bluetooth), a BWP, or a combination thereof for performing the requested procedure. UE 115-*d* may perform the requested procedure in accordance with one or more indicated communication parameters.

In one example, the communication parameter indication 315 may indicate a frequency for UE 115-*d* to use, and a UU communication type. In some cases, the indication may indicate UE 115-*d* to fulfil the UU communication with base station 105-*b*. In some cases, UE 115-*b* may autonomously determine, or be preconfigured to perform UU communications with base station 105-*b*. Accordingly, UE 115-*d* may receive one or more charging signals 320 (e.g., RF signals) from base station 105-*b*, and use the one or more charging signals 320 to harvest energy. In some cases, UE 115-*b* may determine to perform the UU communication with another device, such as a base station 105 other than base station 105-*b*. Accordingly, UE 115-*b* may determine which device to perform the indicated UU communication with and perform the requested procedure with the determined device (e.g., base station 105-*b*).

In another example, the communication parameter indications 315 may indicate a frequency for UE 115-*d* to use, and a sidelink communication type. In some cases, the indication may indicate UE 115-*d* to fulfill the sidelink communication with UE 115-*e*. In some cases, UE 115-*d* may autonomously determine, or be preconfigured to perform sidelink communications with UE 115-*e*. Accordingly, UE 115-*d* may determine which device to perform the indicated sidelink communication with and perform the requested procedure with the determined device (e.g., UE 115-*b*). In some cases, UE 115-*d* and/or base station 105-*b* may indicate to UE 115-*e* to transmit one or more charging signals 320 to UE 115-*d*. In some cases, UE 115-*e* may be preconfigured to transmit charging signals 320 to one or more other devices, such as UE 115-*d*. Accordingly, UE 115-*d* may receive one or more charging signals 320 (e.g., RF signals) from UE 115-*e* (e.g., via communication link 305-*c*) and use the one or more charging signals 320 to harvest energy.

In some implementations, the one or more communication parameters indicated to the UE 115 by the base station 105 may be based on a capability of the UE 115, a capability of the base station 105, or both to support the one or more communication parameters. For example, in some cases, the UE 115 may transmit, to the base station 105, an indication of one or more communications types, one or more frequency ranges, one or more bandwidth parts, or a combination thereof the UE 115 supports (e.g., via RRC, UCI, MAC-CE). In some cases, the base station 105 may transmit, to the UE 115, an indication of one or more communications types, one or more frequency ranges, one or more bandwidth parts, or a combination thereof the base station supports (e.g., via RRC, UCI, MAC-CE). Accordingly, the base station 105 may select from a set of communications types, frequency ranges, bandwidths parts, or a combination thereof that the UE 115, the base station 105, or both supports and transmit the selected communication parameters to the UE 115.

In some cases, the UE 115 and/or the base station 105 may determine which communication parameters may be used (or are preferred) for security key determination and usage, and which communication parameters may be used (or are preferred) for energy harvesting. As described with reference to FIG. 2, the UE 115, the base station 105, or both may determine an ordering of communication types, frequency ranges, bandwidth parts, or a combination thereof. For example, a set of a communication types may be ordered based on preferred use of each communication type for a security key determination procedure, or energy harvesting procedure. Similarly, a set of frequency ranges and/or bandwidth parts may be ordered based on preferred use of each communication type for a security key determination procedure, or energy harvesting procedure. For example, an ordered list of frequency ranges may order the frequency ranges starting with the frequency range that is preferred for energy harvesting (e.g., a low or lowest frequency range) and ending with the frequency range that is preferred for security key determination (e.g., a high or highest frequency range). In some cases, an ordered list of frequency ranges configured in this way may result in: LTE, Sub-6, FR2, FR2x, or FR4. In another example, an ordered list of communication types may order the communication types starting with the communication type that is preferred for energy harvesting and ending with the communication type that is preferred for security key determination (e.g., a short range communication type). In some implementations, frequency ranges and communication types may be ordered in the same list. For example, Wi-Fi and LTE (e.g., FR1) may be equally or similarly preferred for energy harvesting and Bluetooth and FR2 may be equally or similarly not preferred for energy harvesting. As such, an order list from energy harvesting to security key determination may include: LTE/Wi-Fi . . . Bluetooth, FR2.

In some implementations, the UE 115 may order the communication types, the frequency ranges, the bandwidth parts, or a combination thereof, and transmit an indication of the one or more ordered lists to the base station 105. In some implementations, the base station 105 may order the communication types, the frequency ranges, the bandwidth parts, or a combination thereof, and transmit an indication of the one or more ordered lists to the UE 115. In some cases, the UE 115 and base station 105 may agree on the ordering of the one or more ordered lists, or determine the lists together. In some cases, the ordering of the one or more ordered lists may be preconfigured, and the UE 115 and base station 105 may determine that one or more ordered lists based on the preconfiguration. The ordering and/or the content of each ordered list may be configured aperiodically, semi-statically, or dynamically.

In some cases, the ordered list may include any communication parameter supported by a network, or may include communication parameters supported by the UE 115, the base station 105, or both. For example, the UE 115 and base station 105 may be communicating in a network, where the network may support UU communications, sidelink communications, Wifi, Bluetooth for communication types, and may support LTE, FR2, and FR4 for frequency ranges. however, the UE 115 and base station 105 may support UU communications, sidelink communications for communication types, and may support LTE for frequency ranges. Accordingly, in some cases, the UE 115, the base station 105, or both, may determine an order of any potential frequency range that is supported by the network, even if the base station 105 and/or UE 115 do not support one or more of the frequency ranges supported by the network. In some other cases, the UE 115, the base station 105, or both, may only order the frequency ranges that tare supported by the base station 105 and UE 115.

The UE 115, base station 105, or both may determine which communication parameters to use based on the one or more ordered lists and the requested procedure. For example, if the UE 115 requests an energy harvesting procedure, the UE 115 and/or the base station 105 may determine to use the first frequency in the ordered list associated with energy harvesting (e.g., LTE) to perform the requested procedure in accordance with the ordered list. In some cases, the UE 115 or the base station 105 may determine that UE 115 and/or base station 105 do not support the frequency range (e.g., LTE), or that the frequency range is unavailable, or a combination thereof. Accordingly, the UE 115 and/or the base station 105 may determine to use the next frequency in the ordered list (e.g., FR2) to perform the requested procedure based on the ordered list, and so on until the UE 115 and/or base station 105 identify an available, supported frequency range to use for the requested procedure in accordance with the order list.

In some cases, the UE 115 and/or the base station 105 may determine a bandwidth part based on an order list of bandwidth parts, or may determine a bandwidth part based on a frequency range. For example, if the UE 115 requests to perform an energy harvesting procedure and determines that instead of LTE, the UE 115 is to use FR2x (based on availably, support), then the UE 115 and/or base station 105 may determine to select a low (or lowest) bandwidth part that is available in FR2x to perform the procedure.

In some cases, the UE 115 and/or base station 105 may determine a communication type based on an ordered list of communication types, or may determine a communication type based on a frequency range. In some cases, the UE 115 and/or base station 105 may select the communication type based on the frequency range associated with the communication type. For example, sidelink may be deployed in FR2 and UU may be deployed in FR1. If the UE 115 requests to perform an energy harvesting procedure, then the UE 115 and/or base station 105 may determine that UU communications should be used because FR2 is a higher frequency range that FR1, and the lower frequency range is preferred for FR1.

In some implementations, a UE 115 may transmit multiple procedure requests 310 (e.g., in the same or different transmissions), where the UE 115 may request to perform both a security key determination procedure and an energy harvesting procedure. In such cases, the base station 105 may transmit an indication of a first set of communication parameters to use for the security key determination procedure and an indication of a second set of communication parameters to use for the energy harvesting procedure. Each parameter included in the first set and the second set may be different, or some one or more of the parameters may overlap. As such, the UE 115 may perform the security key determination procedure and the energy harvesting procedure at the same or overlapping times.

Figure 4:
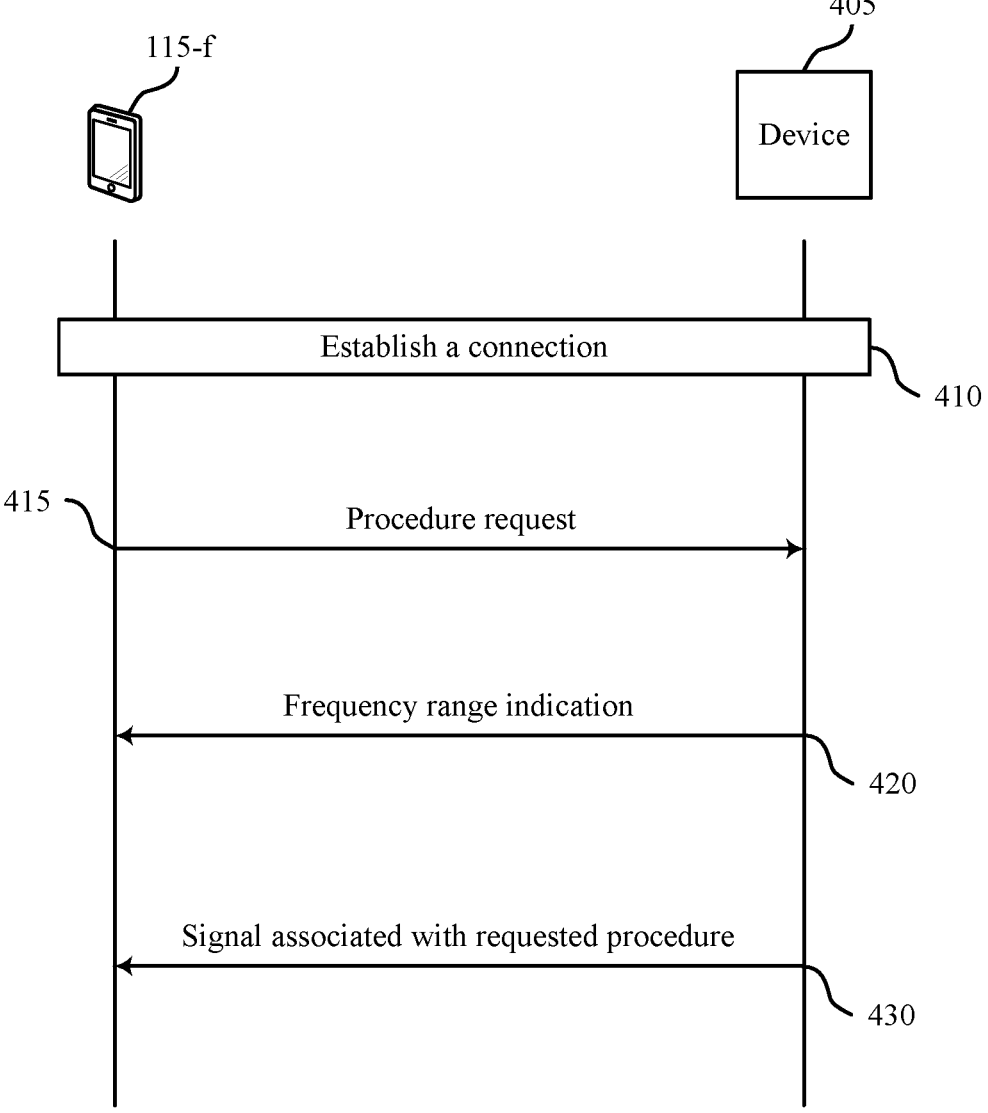
FIG. 4 illustrates an example of a process flow that supports techniques for enabling secure communications or energy transfer operations in accordance with aspects of the present disclosure.

FIG. 4 illustrates an example of a process flow 400 that supports techniques for enabling secure communications or energy transfer operations in accordance with aspects of the present disclosure. The process flow 400 may illustrate an example procedure request scheme. For example, UE 115-*f* may determine to perform a security key determination procedure, or energy harvesting procedure, or both and transmit one or more requests to device 405 to perform one or both of the procedures. Device 405 may be a UE 115, a base station 105, or some other network device (e.g., node). Device 405 and UE 115-*f* may be examples of the corresponding wireless devices described with reference to FIGS. 1 through 3. In some cases, instead of UE 115-*f* implementing the procedure request scheme, a different type of wireless device (e.g., a base station 105) may perform a same or similar scheme. Alternative examples of the following may be implemented, where some steps are performed in a different order than described or are not performed at all. In some cases, steps may include additional features not mentioned below, or further steps may be added.

At 410, UE 115-*f* may establish a connection with device 405. In some cases, establishing a connection may include establishing a communication link with device 405.

At 415, UE 115-*f* may transmit a procedure request to device 405. In some cases, transmitting a procedure request may include transmitting a request to device 405 in wireless communication with UE 115-*f*, where the request may be for device 405 to transmit a signal to UE 115-*f* as part of an energy transfer procedure, a security key generation procedure, or both.

At 420, UE 115-*f* may receive a frequency range indication from device 405. In some cases, receiving a frequency range request may include receiving, from device 405, an indication of at least a frequency range to be used for fulfilling the request. In some cases, UE 115-*f* may transmit a capability message indicating one or more frequency ranges that UE 115-*f* supports, wherein the indicated frequency range may be one of the one or more frequency ranges supported by UE 115-*f*.

In some cases, UE 115-*f* may identify an ordered list of frequency ranges, where the ordered list of frequency ranges may include a plurality of frequency ranges ordered based on an ability of each frequency range of the plurality of frequency ranges to support the energy transfer procedure, the security key generation procedure, or both. In some cases, receiving the indication of at least the frequency range may include receiving a message indicating a first set of frequency ranges included in the ordered list of frequency ranges associated with the security key generation procedure, or a second set of frequency ranges included in the ordered list of frequency ranges associated with the energy transfer procedure. Accordingly, UE 115-*f* may determine the frequency range from the ordered list of frequency ranges to be used for fulfilling the request based at least on part on the requested procedure.

In some implementations, UE 115-*f* may determine a radio access technology type to be used for fulfilling the request based at least in part on availability of the indicated frequency range for different radio access technology types.

In some cases, UE 115-*f* may identify a switching pattern, where the switching pattern may indicate a pattern for switching between frequency ranges, radio access technology types, bandwidth parts, or a combination thereof. Accordingly, UE 115-*f* may switch between the frequency ranges, the radio access technology types, the bandwidth parts, or a combination thereof, in accordance with the switching pattern to perform the requested procedure. The switching pattern may include switching between the frequency ranges, the radio access technology types, the bandwidth parts, or a combination thereof in accordance with a switching duration. In some implementations, UE 115-f may transmit a capability of UE 115-f to switch between the radio access technology types, the bandwidth parts, or a combination thereof, wherein the switching duration is based at least in part on the capability of UE 115-f, the device 405, or both. UE 115-f may receive a message indicating the switching duration, where the message is an RRC message, or a MAC-CE message.

In some cases, receiving the indication of at least the frequency range may include receiving an RRC message, or MAC-CE message, of both including the indication of at least of the frequency range to be used for fulfilling the request.

At 425, UE 115-f may receive the signal pursuant to the request and the indicated frequency range, the signal providing energy for the energy transfer procedure or being a basis for security key generation during the security key generation procedure.

In some cases, UE 115-f may receive a message indicating a radio access technology type to be used for fulfilling the request, wherein the signal is received pursuant to the radio access technology type. In some implementations, UE 115-f may transmit a capability message indicating one or more supported radio access technology types that UE 115-f supports, wherein the radio access technology indicated by the message is one of the one or more supported radio access technology types.

UE 115-f may identify an ordered list of radio access technology types, where the ordered list of radio access technology types may include a plurality of radio access technology types ordered based at least in part on an ability of each radio access technology type of the plurality of the radio access technology types to support the energy transfer procedure, the security key generation procedure, or both. In some cases, receiving the message indicating the radio access technology type to be used for fulfilling the request may include UE 115-f receive, in the message, an indication of one or more radio access technology types included in the ordered listed of radio access technology types associated with the security key generation procedure, or one or more radio access technology types included in the ordered listed of radio access technology types associated with the energy transfer procedure, or both. Accordingly, UE 115-f may determine the radio access technology type from the ordered list of radio access technology types to be used for fulfilling the request based at least on part on the requested procedure.

In some implementations, UE 115-f may receive a message indicating a bandwidth part to be used for fulfilling the request, where the bandwidth part may be included in the frequency range. Accordingly, UE 115-f may receive the signal pursuant to the request and the bandwidth part, where the signal may provide energy for the energy transfer procedure or may be the basis for security key generation during the security key generation procedure.

In some cases, receiving the signal may include UE 115-f receiving a first reference signal as part of a security key generation procedure pursuant to the request and the indicated frequency range, wherein the first reference signal is the signal. UE 115-f may transmit a second reference signal as part of the security key generation procedure, and determine a security key to be applied to one or more messages based at least in part on the first reference signal and the second reference signal.

In some cases, receiving the signal may include receiving a charging signal as part of the energy transfer procedure pursuant to the request and the indicated frequency range, and harvesting the energy from the charging signal.

Figure 5:
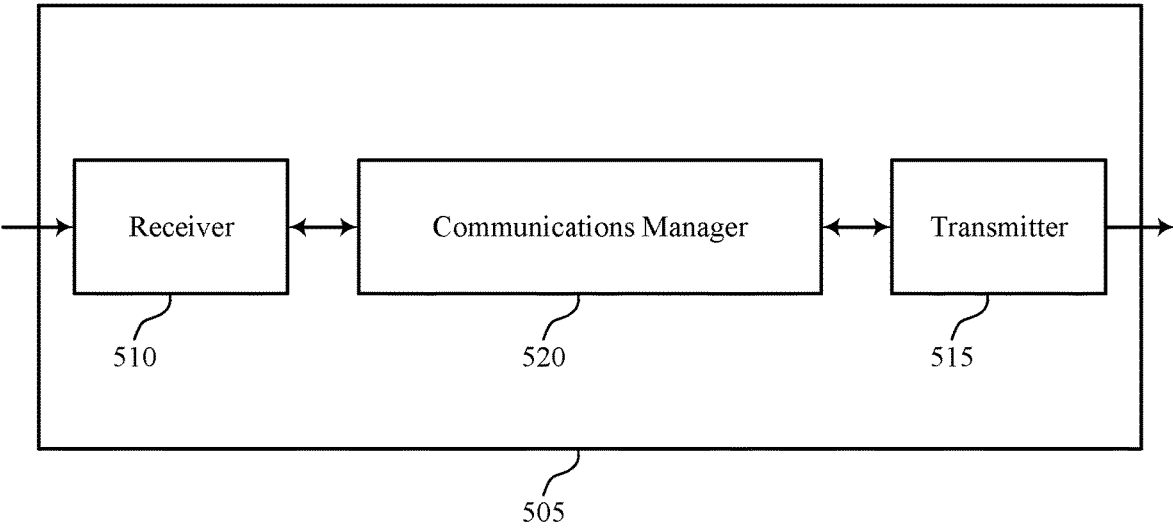
FIGS. 5 and 6 show block diagrams of devices that support techniques for enabling secure communications or energy transfer operations in accordance with aspects of the present disclosure.

FIG. 5 shows a block diagram 500 of a device 505 that supports techniques for enabling secure communications or energy transfer operations in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for enabling secure communications or energy transfer operations). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for enabling secure communications or energy transfer operations). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for enabling secure communications or energy transfer operations as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for transmitting a request to a device in wireless communication with the UE, the request being for the device to transmit a signal to the UE as part of an energy transfer procedure, a security key generation procedure, or both. The communications manager 520 may be configured as or otherwise support a means for receiving, from the device, an indication of at least a frequency range to be used for fulfilling the request. The communications manager 520 may be configured as or otherwise support a means for receiving the signal pursuant to the request and the indicated frequency range, the signal providing energy for the energy transfer procedure or being a basis for security key generation during the security key generation procedure.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources.

Figure 6:
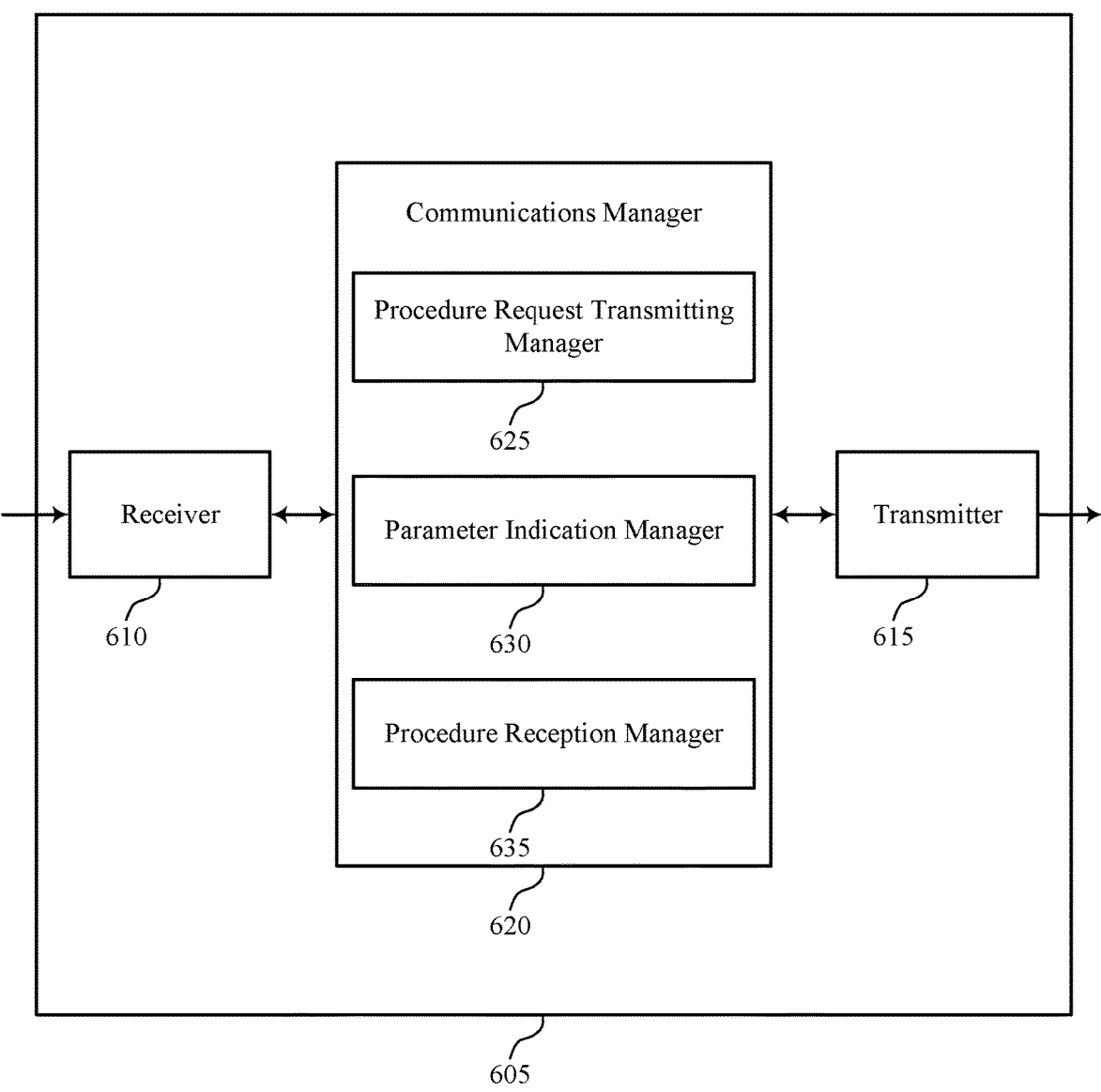

FIG. 6 shows a block diagram 600 of a device 605 that supports techniques for enabling secure communications or energy transfer operations in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for enabling secure communications or energy transfer operations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for enabling secure communications or energy transfer operations). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for enabling secure communications or energy transfer operations as described herein. For example, the communications manager 620 may include a procedure request transmitting manager 625, a parameter indication manager 630, a procedure reception manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The procedure request transmitting manager 625 may be configured as or otherwise support a means for transmitting a request to a device in wireless communication with the UE, the request being for the device to transmit a signal to the UE as part of an energy transfer procedure, a security key generation procedure, or both. The parameter indication manager 630 may be configured as or otherwise support a means for receiving, from the device, an indication of at least a frequency range to be used for fulfilling the request. The procedure reception manager 635 may be configured as or otherwise support a means for receiving the signal pursuant to the request and the indicated frequency range, the signal providing energy for the energy transfer procedure or being a basis for security key generation during the security key generation procedure.

Figure 7:
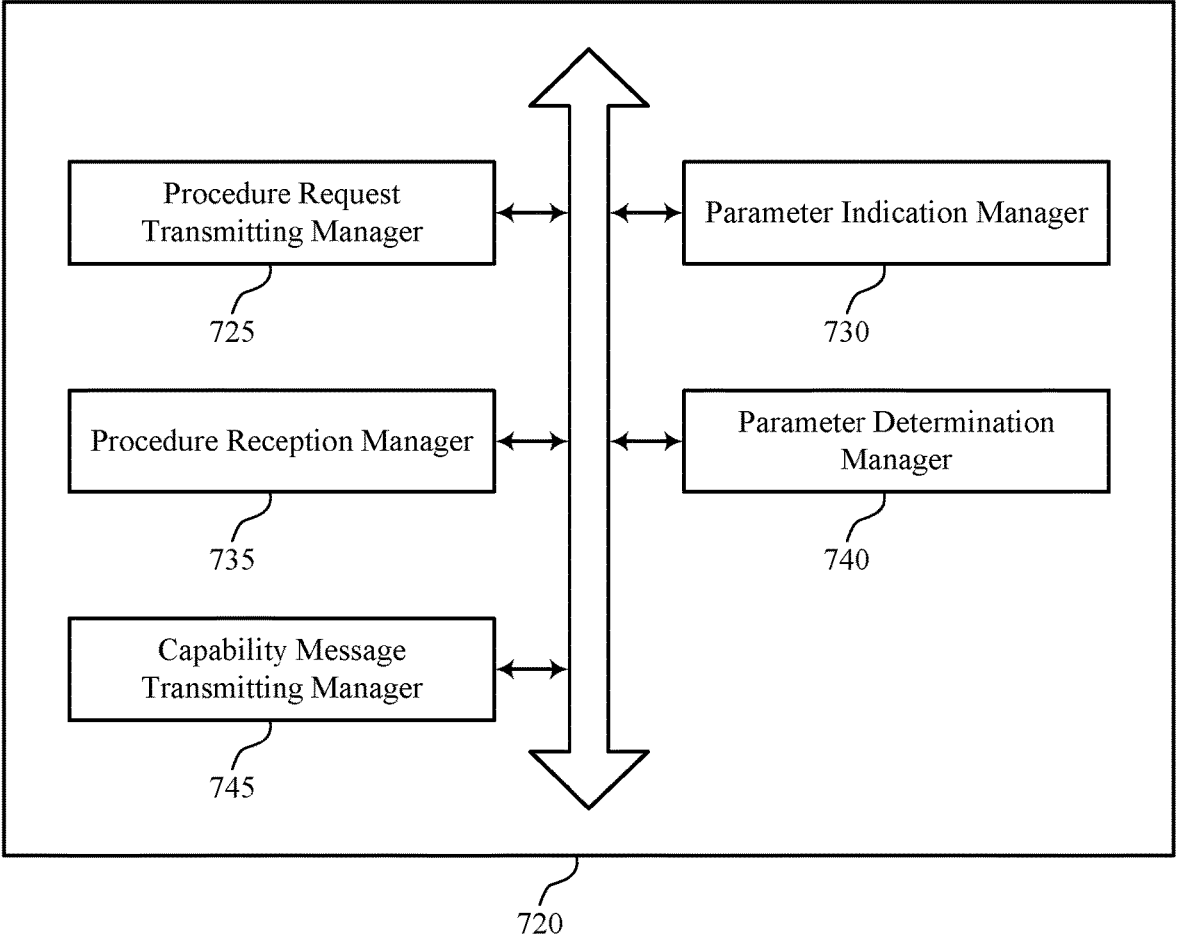
FIG. 7 shows a block diagram of a communications manager that supports techniques for enabling secure communications or energy transfer operations in accordance with aspects of the present disclosure.

FIG. 7 shows a block diagram 700 of a communications manager 720 that supports techniques for enabling secure communications or energy transfer operations in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for enabling secure communications or energy transfer operations as described herein. For example, the communications manager 720 may include a procedure request transmitting manager 725, a parameter indication manager 730, a procedure reception manager 735, a parameter determination manager 740, a capability message transmitting manager 745, or any combination thereof. Each of these components may communicate, directly or indirectly, with one another (e.g., via one or more buses).

The communications manager 720 may support wireless communications at a UE in accordance with examples as disclosed herein. The procedure request transmitting manager 725 may be configured as or otherwise support a means for transmitting a request to a device in wireless communication with the UE, the request being for the device to transmit a signal to the UE as part of an energy transfer procedure, a security key generation procedure, or both. The parameter indication manager 730 may be configured as or otherwise support a means for receiving, from the device, an indication of at least a frequency range to be used for fulfilling the request. The procedure reception manager 735 may be configured as or otherwise support a means for receiving the signal pursuant to the request and the indicated frequency range, the signal providing energy for the energy transfer procedure or being a basis for security key generation during the security key generation procedure.

In some examples, the parameter indication manager 730 may be configured as or otherwise support a means for receiving a message indicating a radio access technology type to be used for fulfilling the request, where the signal is received pursuant to the radio access technology type.

In some examples, the capability message transmitting manager 745 may be configured as or otherwise support a means for transmitting a capability message indicating one or more supported radio access technology types that the UE supports, where the radio access technology indicated by the message is one of the one or more supported radio access technology types.

In some examples, the parameter determination manager 740 may be configured as or otherwise support a means for identifying an ordered list of radio access technology types, the ordered list of radio access technology types including a set of multiple radio access technology types ordered based on an ability of each radio access technology type of the set of multiple the radio access technology types to support the energy transfer procedure, the security key generation procedure, or both.

In some examples, to support receiving the message indicating the radio access technology type to be used for fulfilling the request, the parameter indication manager 730 may be configured as or otherwise support a means for receiving, in the message, an indication of one or more radio access technology types included in the ordered listed of radio access technology types associated with the security key generation procedure, or one or more radio access technology types included in the ordered listed of radio access technology types associated with the energy transfer procedure, or both. In some examples, to support receiving the message indicating the radio access technology type to be used for fulfilling the request, the parameter determination manager 740 may be configured as or otherwise support a means for determining the radio access technology type from the ordered list of radio access technology types to be used for fulfilling the request based at least on part on the requested procedure.

In some examples, the parameter determination manager 740 may be configured as or otherwise support a means for determining a radio access technology type to be used for fulfilling the request based on availability of the indicated frequency range for different radio access technology types.

In some examples, the parameter indication manager 730 may be configured as or otherwise support a means for receiving a message indicating a bandwidth part to be used for fulfilling the request, the bandwidth part included in the frequency range. In some examples, the procedure reception manager 735 may be configured as or otherwise support a means for receiving the signal pursuant to the request and the bandwidth part, the signal providing energy for the energy transfer procedure or being the basis for security key generation during the security key generation procedure.

In some examples, the capability message transmitting manager 745 may be configured as or otherwise support a means for transmitting a capability message indicating one or more frequency ranges that the UE supports, where the indicated frequency range is one of the one or more frequency ranges supported by the UE.

In some examples, the parameter determination manager 740 may be configured as or otherwise support a means for identifying an ordered list of frequency ranges, the ordered list of frequency ranges including a set of multiple frequency ranges ordered based on an ability of each frequency range of the set of multiple frequency ranges to support the energy transfer procedure, the security key generation procedure, or both.

In some examples, to support receiving the indication of at least the frequency range, the parameter indication manager 730 may be configured as or otherwise support a means for receiving a message indicating a first set of frequency ranges included in the ordered list of frequency ranges associated with the security key generation procedure, or a second set of frequency ranges included in the ordered list of frequency ranges associated with the energy transfer procedure. In some examples, to support receiving the indication of at least the frequency range, the parameter determination manager 740 may be configured as or otherwise support a means for determining the frequency range from the ordered list of frequency ranges to be used for fulfilling the request based at least on part on the requested procedure.

In some examples, the parameter determination manager 740 may be configured as or otherwise support a means for identifying a switching pattern, the switching pattern indicating a pattern for switching between frequency ranges, radio access technology types, bandwidth parts, or a combination thereof. In some examples, the parameter determination manager 740 may be configured as or otherwise support a means for switching between the frequency ranges, the radio access technology types, the bandwidth parts, or a combination thereof, in accordance with the switching pattern to perform the requested procedure.

In some examples, the switching pattern switches between the frequency ranges, the radio access technology types, the bandwidth parts, or a combination thereof in accordance with a switching duration.

In some examples, the capability message transmitting manager 745 may be configured as or otherwise support a means for transmitting a capability of the UE to switch between the radio access technology types, the bandwidth parts, or a combination thereof, where the switching duration is based on the capability of the UE, the device, or both.

In some examples, the parameter indication manager 730 may be configured as or otherwise support a means for receiving a message indicating the switching duration, the message being a radio resource control message, or a medium access control element message.

In some examples, to support receiving the indication of at least the frequency range, the parameter indication manager 730 may be configured as or otherwise support a means for receiving a radio resource control message, or medium access control element message, of both including the indication of at least of the frequency range to be used for fulfilling the request.

In some examples, to support receiving the signal, the procedure reception manager 735 may be configured as or otherwise support a means for receiving a first reference signal as part of a security key generation procedure pursuant to the request and the indicated frequency range, where the first reference signal is the signal. In some examples, to support receiving the signal, the procedure reception manager 735 may be configured as or otherwise support a means for transmitting a second reference signal as part of the security key generation procedure. In some examples, to support receiving the signal, the procedure reception manager 735 may be configured as or otherwise support a means for determining a security key to be applied to one or more messages based on the first reference signal and the second reference signal.

In some examples, to support receiving the signal, the procedure reception manager 735 may be configured as or otherwise support a means for receiving a charging signal as part of the energy transfer procedure pursuant to the request and the indicated frequency range. In some examples, to support receiving the signal, the procedure reception manager 735 may be configured as or otherwise support a means for harvesting the energy from the charging signal.

In some examples, the device is one of a base station or an additional UE.

Figure 8:
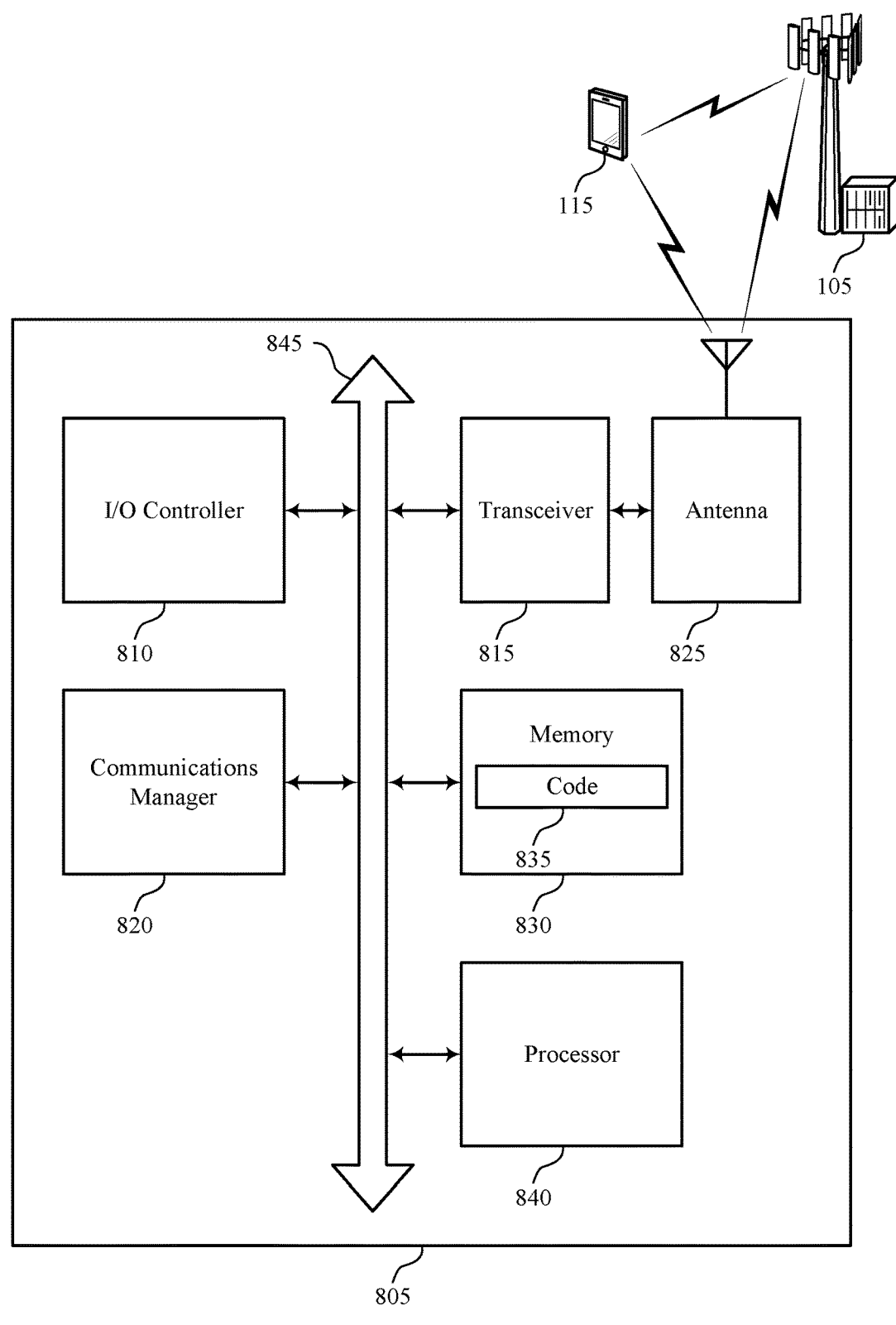
FIG. 8 shows a diagram of a system including a device that supports techniques for enabling secure communications or energy transfer operations in accordance with aspects of the present disclosure.

FIG. 8 shows a diagram of a system 800 including a device 805 that supports techniques for enabling secure communications or energy transfer operations in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for enabling secure communications or energy transfer operations). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for transmitting a request to a device in wireless communication with the UE, the request being for the device to transmit a signal to the UE as part of an energy transfer procedure, a security key generation procedure, or both. The communications manager 820 may be configured as or otherwise support a means for receiving, from the device, an indication of at least a frequency range to be used for fulfilling the request. The communications manager 820 may be configured as or otherwise support a means for receiving the signal pursuant to the request and the indicated frequency range, the signal providing energy for the energy transfer procedure or being a basis for security key generation during the security key generation procedure.

By including or configuring the communications manager 820 in accordance with examples as described herein, the device 805 may support techniques for improved communication reliability, more efficient utilization of communication resources, improved coordination between devices, longer battery life, improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for enabling secure communications or energy transfer operations as described herein, or the processor 840 and the memory 830 may be otherwise configured to perform or support such operations.

Figure 9:
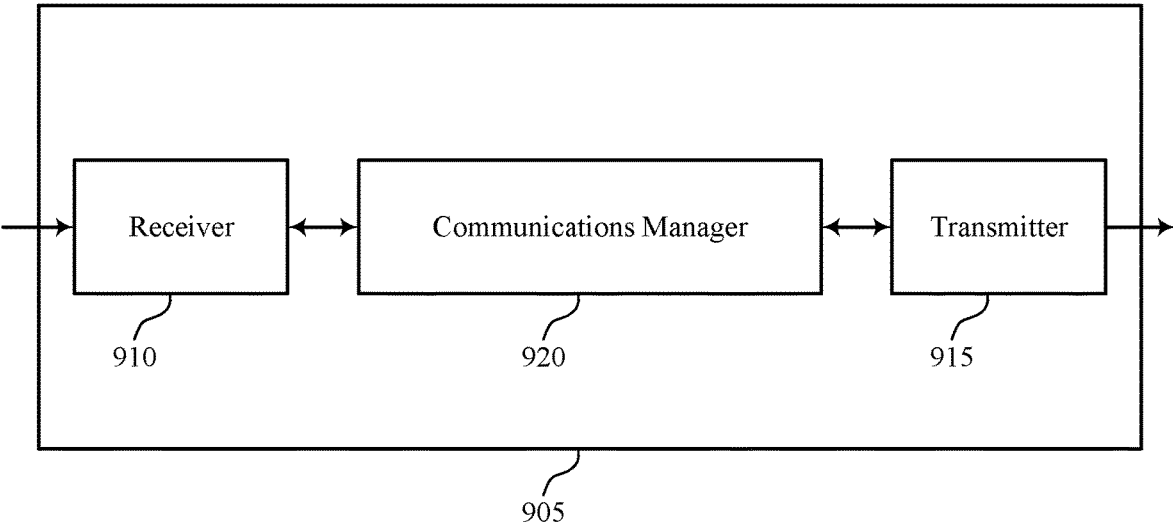
FIGS. 9 and 10 show block diagrams of devices that support techniques for enabling secure communications or energy transfer operations in accordance with aspects of the present disclosure.

FIG. 9 shows a block diagram 900 of a device 905 that supports techniques for enabling secure communications or energy transfer operations in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for enabling secure communications or energy transfer operations). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for enabling secure communications or energy transfer operations). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for enabling secure communications or energy transfer operations as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a device in accordance with examples as disclosed herein. For example, the communications manager 920 may be configured as or otherwise support a means for receiving a request from a UE in wireless communication with the device, the request being for the device to transmit a signal to the UE as part of an energy transfer procedure, a security key generation procedure, or both. The communications manager 920 may be configured as or otherwise support a means for transmitting, to the UE, an indication of at least a frequency range to be used for fulfilling the request. The communications manager 920 may be configured as or otherwise support a means for transmitting the signal pursuant to the request and the indicated frequency range, the signal providing energy for the energy transfer procedure or being a basis for security key generation during the security key generation procedure.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources.

Figure 10:
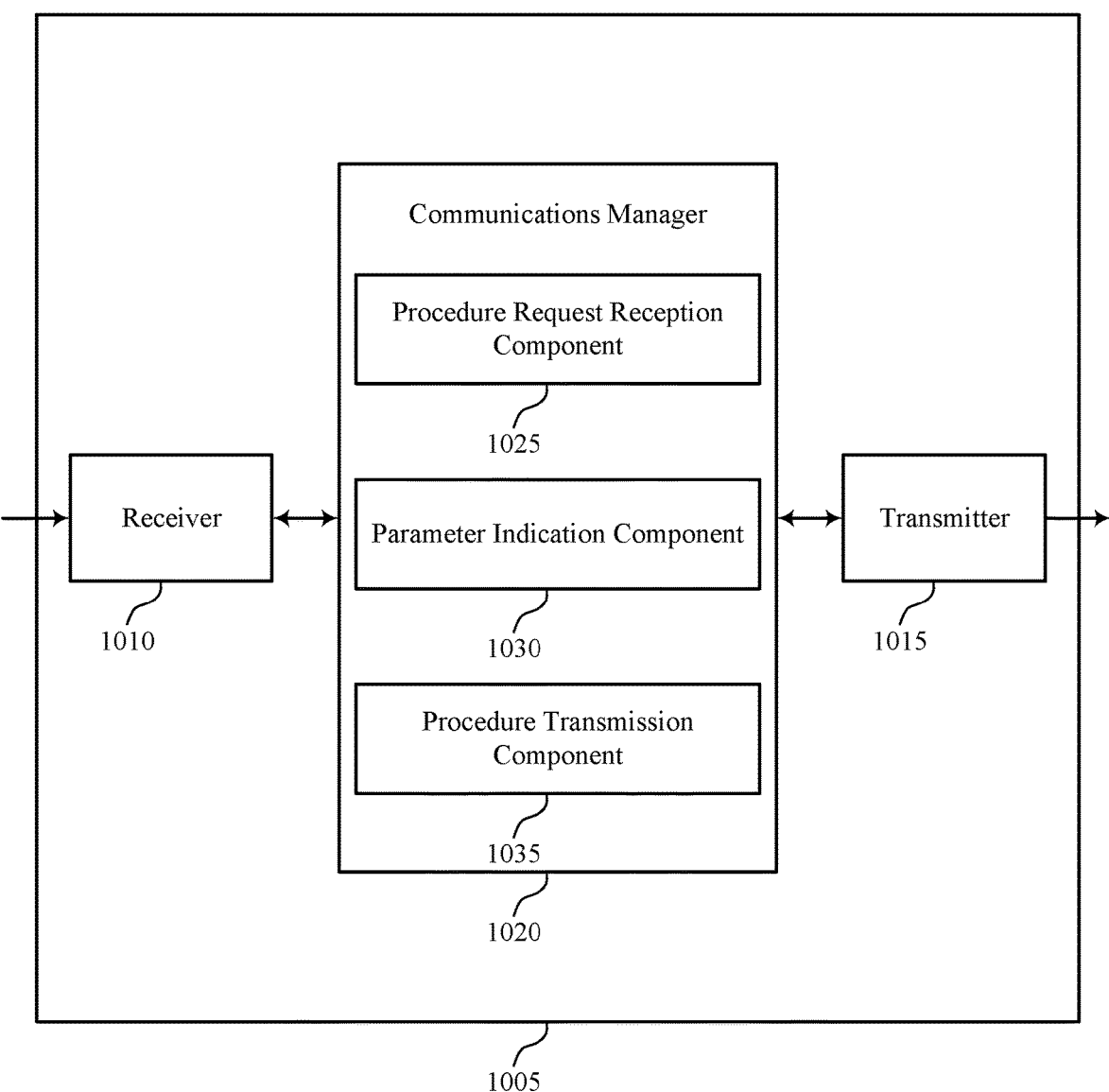

FIG. 10 shows a block diagram 1000 of a device 1005 that supports techniques for enabling secure communications or energy transfer operations in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for enabling secure communications or energy transfer operations). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for enabling secure communications or energy transfer operations). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for enabling secure communications or energy transfer operations as described herein. For example, the communications manager 1020 may include a procedure request reception component 1025, a parameter indication component 1030, a procedure transmission component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a device in accordance with examples as disclosed herein. The procedure request reception component 1025 may be configured as or otherwise support a means for receiving a request from a UE in wireless communication with the device, the request being for the device to transmit a signal to the UE as part of an energy transfer procedure, a security key generation procedure, or both. The parameter indication component 1030 may be configured as or otherwise support a means for transmitting, to the UE, an indication of at least a frequency range to be used for fulfilling the request. The procedure transmission component 1035 may be configured as or otherwise support a means for transmitting the signal pursuant to the request and the indicated frequency range, the signal providing energy for the energy transfer procedure or being a basis for security key generation during the security key generation procedure.

Figure 11:
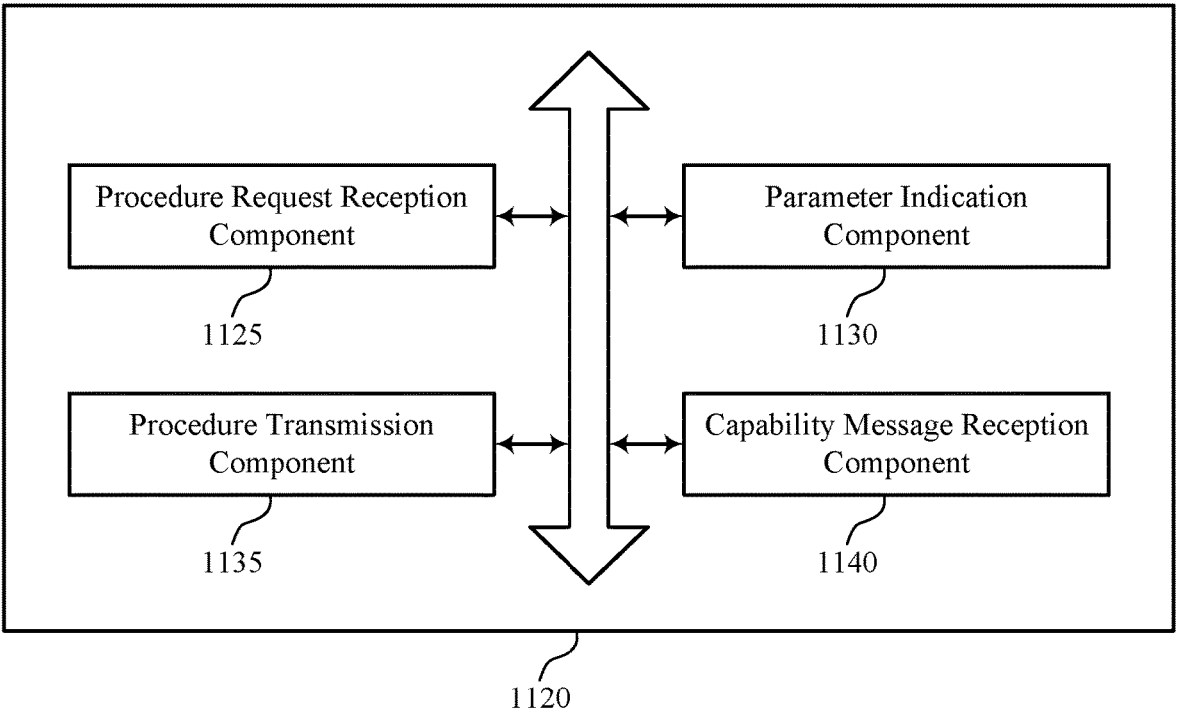
FIG. 11 shows a block diagram of a communications manager that supports techniques for enabling secure communications or energy transfer operations in accordance with aspects of the present disclosure.

FIG. 11 shows a block diagram 1100 of a communications manager 1120 that supports techniques for enabling secure communications or energy transfer operations in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for enabling secure communications or energy transfer operations as described herein. For example, the communications manager 1120 may include a procedure request reception component 1125, a parameter indication component 1130, a procedure transmission component 1135, a capability message reception component 1140, or any combination thereof. Each of these components may communicate, directly or indirectly, with one another (e.g., via one or more buses).

The communications manager 1120 may support wireless communications at a device in accordance with examples as disclosed herein. The procedure request reception component 1125 may be configured as or otherwise support a means for receiving a request from a UE in wireless communication with the device, the request being for the device to transmit a signal to the UE as part of an energy transfer procedure, a security key generation procedure, or both. The parameter indication component 1130 may be configured as or otherwise support a means for transmitting, to the UE, an indication of at least a frequency range to be used for fulfilling the request. The procedure transmission component 1135 may be configured as or otherwise support a means for transmitting the signal pursuant to the request and the indicated frequency range, the signal providing energy for the energy transfer procedure or being a basis for security key generation during the security key generation procedure.

In some examples, the parameter indication component 1130 may be configured as or otherwise support a means for transmitting a message indicating a radio access technology type to be used for fulfilling the request, where the signal is transmitted pursuant to the radio access technology.

In some examples, the capability message reception component 1140 may be configured as or otherwise support a means for receiving a capability message indicating one or more supported radio access technology types that the UE supports, where the radio access technology indicated by the message is one of the one or more supported radio access technology types.

In some examples, the parameter indication component 1130 may be configured as or otherwise support a means for identifying an ordered list of radio access technology types, the ordered list of radio access technology types including a set of multiple radio access technology types ordered based on an ability of each radio access technology type of the set of multiple the radio access technology types to support the energy transfer procedure, the security key generation procedure, or both.

In some examples, to support transmitting the message indicating the radio access technology to be used for fulfilling the request, the parameter indication component 1130 may be configured as or otherwise support a means for transmitting, in the message, an indication of one or more radio access technology types included in the ordered listed of radio access technology types associated with the security key generation procedure, or one or more radio access technology types included in the ordered listed of radio access technology types associated with the energy transfer procedure, or both. In some examples, to support transmitting the message indicating the radio access technology to be used for fulfilling the request, the parameter indication component 1130 may be configured as or otherwise support a means for determining the radio access technology type from the ordered list of radio access technology types to be used for fulfilling the request based at least on part on the requested procedure.

In some examples, the parameter indication component 1130 may be configured as or otherwise support a means for determining a radio access technology type to be used for fulfilling the request based on availability of the indicated frequency range for different radio access technology types.

In some examples, the parameter indication component 1130 may be configured as or otherwise support a means for transmitting a message indicating a bandwidth part to be used for fulfilling the request, the bandwidth part included in the frequency range. In some examples, the procedure transmission component 1135 may be configured as or otherwise support a means for transmitting the signal pursuant to the request and the bandwidth part, the signal providing energy for the energy transfer procedure or being the basis for security key generation during the security key generation procedure.

In some examples, the capability message reception component 1140 may be configured as or otherwise support a means for receiving a capability message indicating one or more frequency ranges that the UE supports, where the indicated frequency range is one of the one or more supported frequency ranges.

In some examples, the parameter indication component 1130 may be configured as or otherwise support a means for identifying an ordered list of frequency ranges, the ordered list of frequency ranges including a set of multiple frequency ranges ordered based on an ability of each frequency range of the set of multiple frequency ranges to support the energy transfer procedure, the security key generation procedure, or both.

In some examples, to support transmitting the indication of at least the frequency range, the parameter indication component 1130 may be configured as or otherwise support a means for transmitting a message indicating a first set of frequency ranges included in the ordered list of frequency ranges associated with the security key generation procedure, or a second set of frequency ranges included in the ordered list of frequency ranges associated with the energy transfer procedure. In some examples, to support transmitting the indication of at least the frequency range, the parameter indication component 1130 may be configured as or otherwise support a means for determining the frequency range from the ordered list of frequency ranges to be used for fulfilling the request based at least on part on the requested procedure.

In some examples, the parameter indication component 1130 may be configured as or otherwise support a means for identifying a switching pattern, the switching pattern indicating a pattern for switching between frequency ranges, radio access technology types, bandwidth parts, or a combination thereof. In some examples, the parameter indication component 1130 may be configured as or otherwise support a means for switching between the frequency ranges, the radio access technology types, the bandwidth parts, or a combination thereof, in accordance with the switching pattern to perform the requested procedure.

Figure 12:
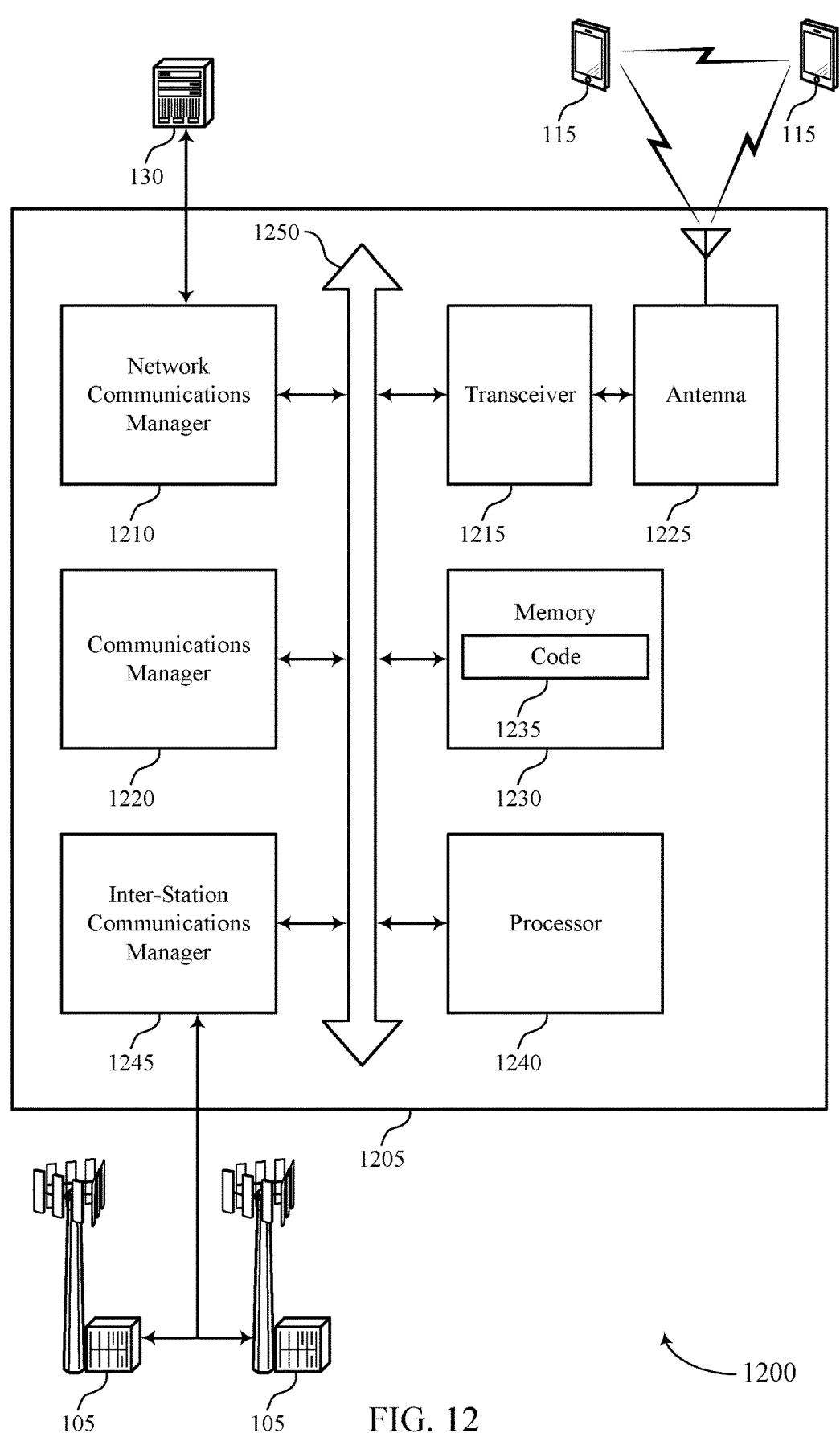
FIG. 12 shows a diagram of a system including a device that supports techniques for enabling secure communications or energy transfer operations in accordance with aspects of the present disclosure.

FIG. 12 shows a diagram of a system 1200 including a device 1205 that supports techniques for enabling secure communications or energy transfer operations in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for enabling secure communications or energy transfer operations). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a device in accordance with examples as disclosed herein. For example, the communications manager 1220 may be configured as or otherwise support a means for receiving a request from a UE in wireless communication with the device, the request being for the device to transmit a signal to the UE as part of an energy transfer procedure, a security key generation procedure, or both. The communications manager 1220 may be configured as or otherwise support a means for transmitting, to the UE, an indication of at least a frequency range to be used for fulfilling the request. The communications manager 1220 may be configured as or otherwise support a means for transmitting the signal pursuant to the request and the indicated frequency range, the signal providing energy for the energy transfer procedure or being a basis for security key generation during the security key generation procedure.

By including or configuring the communications manager 1220 in accordance with examples as described herein, the device 1205 may support techniques for improved communication reliability, more efficient utilization of communication resources, improved coordination between devices, longer battery life, improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for enabling secure communications or energy transfer operations as described herein, or the processor 1240 and the memory 1230 may be otherwise configured to perform or support such operations.

FIG. 13 shows a flowchart illustrating a method 1300 that supports techniques for enabling secure communications or energy transfer operations in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting a request to a device in wireless communication with the UE, the request being for the device to transmit a signal to the UE as part of an energy transfer procedure, a security key generation procedure, or both. The operations of 1305 may be performed in accordance with examples as disclosed herein. In some examples, aspects of the operations of 1305 may be performed by a procedure request transmitting manager 725 as described with reference to FIG. 7.

At 1310, the method may include receiving, from the device, an indication of at least a frequency range to be used for fulfilling the request. The operations of 1310 may be performed in accordance with examples as disclosed herein. In some examples, aspects of the operations of 1310 may be performed by a parameter indication manager 730 as described with reference to FIG. 7.

At 1315, the method may include receiving the signal pursuant to the request and the indicated frequency range, the signal providing energy for the energy transfer procedure or being a basis for security key generation during the security key generation procedure. The operations of 1315 may be performed in accordance with examples as disclosed herein. In some examples, aspects of the operations of 1315 may be performed by a procedure reception manager 735 as described with reference to FIG. 7.

FIG. 14 shows a flowchart illustrating a method 1400 that supports techniques for enabling secure communications or energy transfer operations in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting a request to a device in wireless communication with the UE, the request being for the device to transmit a signal to the UE as part of an energy transfer procedure, a security key generation procedure, or both. The operations of 1405 may be performed in accordance with examples as disclosed herein. In some examples, aspects of the operations of 1405 may be performed by a procedure request transmitting manager 725 as described with reference to FIG. 7.

At 1410, the method may include receiving, from the device, an indication of at least a frequency range to be used for fulfilling the request. The operations of 1410 may be performed in accordance with examples as disclosed herein. In some examples, aspects of the operations of 1410 may be performed by a parameter indication manager 730 as described with reference to FIG. 7.

At 1415, the method may include receiving the signal pursuant to the request and the indicated frequency range, the signal providing energy for the energy transfer procedure or being a basis for security key generation during the security key generation procedure. The operations of 1415 may be performed in accordance with examples as disclosed herein. In some examples, aspects of the operations of 1415 may be performed by a procedure reception manager 735 as described with reference to FIG. 7.

At 1420, the method may include determining a radio access technology type to be used for fulfilling the request based on availability of the indicated frequency range for different radio access technology types. The operations of 1420 may be performed in accordance with examples as disclosed herein. In some examples, aspects of the operations of 1420 may be performed by a parameter determination manager 740 as described with reference to FIG. 7.

FIG. 15 shows a flowchart illustrating a method 1500 that supports techniques for enabling secure communications or energy transfer operations in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include receiving a request from a UE in wireless communication with the device, the request being for the device to transmit a signal to the UE as part of an energy transfer procedure, a security key generation procedure, or both. The operations of 1505 may be performed in accordance with examples as disclosed herein. In some examples, aspects of the operations of 1505 may be performed by a procedure request reception component 1125 as described with reference to FIG. 11.

At 1510, the method may include transmitting, to the UE, an indication of at least a frequency range to be used for fulfilling the request. The operations of 1510 may be performed in accordance with examples as disclosed herein. In some examples, aspects of the operations of 1510 may be performed by a parameter indication component 1130 as described with reference to FIG. 11.

At 1515, the method may include transmitting the signal pursuant to the request and the indicated frequency range, the signal providing energy for the energy transfer procedure or being a basis for security key generation during the security key generation procedure. The operations of 1515 may be performed in accordance with examples as disclosed herein. In some examples, aspects of the operations of 1515 may be performed by a procedure transmission component 1135 as described with reference to FIG. 11.

FIG. 16 shows a flowchart illustrating a method 1600 that supports techniques for enabling secure communications or energy transfer operations in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving a request from a UE in wireless communication with the device, the request being for the device to transmit a signal to the UE as part of an energy transfer procedure, a security key generation procedure, or both. The operations of 1605 may be performed in accordance with examples as disclosed herein. In some examples, aspects of the operations of 1605 may be performed by a procedure request reception component 1125 as described with reference to FIG. 11.

At 1610, the method may include transmitting, to the UE, an indication of at least a frequency range to be used for fulfilling the request. The operations of 1610 may be performed in accordance with examples as disclosed herein. In some examples, aspects of the operations of 1610 may be performed by a parameter indication component 1130 as described with reference to FIG. 11.

At 1615, the method may include transmitting a message indicating a radio access technology type to be used for fulfilling the request, where the signal is transmitted pursuant to the radio access technology. The operations of 1615 may be performed in accordance with examples as disclosed herein. In some examples, aspects of the operations of 1615 may be performed by a parameter indication component 1130 as described with reference to FIG. 11.

At 1620, the method may include transmitting the signal pursuant to the request and the indicated frequency range, the signal providing energy for the energy transfer procedure or being a basis for security key generation during the security key generation procedure. The operations of 1620 may be performed in accordance with examples as disclosed herein. In some examples, aspects of the operations of 1620 may be performed by a procedure transmission component 1135 as described with reference to FIG. 11.

The following provides an overview of aspects of the present disclosure:

Aspect 1: A method for wireless communications at a UE, comprising: transmitting a request to a device in wireless communication with the UE, the request being for the device to transmit a signal to the UE as part of an energy transfer procedure, a security key generation procedure, or both: receiving, from the device, an indication of at least a frequency range to be used for fulfilling the request; and receiving the signal pursuant to the request and the indicated frequency range, the signal providing energy for the energy transfer procedure or being a basis for security key generation during the security key generation procedure.

Aspect 2: The method of aspect 1, further comprising: receiving a message indicating a radio access technology type to be used for fulfilling the request, wherein the signal is received pursuant to the radio access technology type.

Aspect 3: The method of aspect 2, further comprising: transmitting a capability message indicating one or more supported radio access technology types that the UE supports, wherein the radio access technology indicated by the message is one of the one or more supported radio access technology types.

Aspect 4: The method of any of aspects 2 through 3, further comprising: identifying an ordered list of radio access technology types, the ordered list of radio access technology types comprising a plurality of radio access technology types ordered based at least in part on an ability of each radio access technology type of the plurality of the radio access technology types to support the energy transfer procedure, the security key generation procedure, or both.

Aspect 5: The method of aspect 4, wherein receiving the message indicating the radio access technology type to be used for fulfilling the request further comprises: receiving, in the message, an indication of one or more radio access technology types included in the ordered listed of radio access technology types associated with the security key generation procedure, or one or more radio access technology types included in the ordered listed of radio access technology types associated with the energy transfer procedure, or both; and determining the radio access technology type from the ordered list of radio access technology types to be used for fulfilling the request based at least on part on the requested procedure.

Aspect 6: The method of any of aspects 1 through 5, further comprising: determining a radio access technology type to be used for fulfilling the request based at least in part on availability of the indicated frequency range for different radio access technology types.

Aspect 7: The method of any of aspects 1 through 6, further comprising: receiving a message indicating a bandwidth part to be used for fulfilling the request, the bandwidth part included in the frequency range; and receiving the signal pursuant to the request and the bandwidth part, the signal providing energy for the energy transfer procedure or being the basis for security key generation during the security key generation procedure.

Aspect 8: The method of any of aspects 1 through 7, further comprising: transmitting a capability message indicating one or more frequency ranges that the UE supports, wherein the indicated frequency range is one of the one or more frequency ranges supported by the UE.

Aspect 9: The method of any of aspects 1 through 8, further comprising: identifying an ordered list of frequency ranges, the ordered list of frequency ranges comprising a plurality of frequency ranges ordered based at least in part on an ability of each frequency range of the plurality of frequency ranges to support the energy transfer procedure, the security key generation procedure, or both.

Aspect 10: The method of aspect 9, wherein receiving the indication of at least the frequency range further comprises: receiving a message indicating a first set of frequency ranges included in the ordered list of frequency ranges associated with the security key generation procedure, or a second set of frequency ranges included in the ordered list of frequency ranges associated with the energy transfer procedure; and determining the frequency range from the ordered list of frequency ranges to be used for fulfilling the request based at least on part on the requested procedure.

Aspect 11: The method of any of aspects 1 through 10, further comprising: identifying a switching pattern, the switching pattern indicating a pattern for switching between frequency ranges, radio access technology types, bandwidth parts, or a combination thereof; and switching between the frequency ranges, the radio access technology types, the bandwidth parts, or a combination thereof, in accordance with the switching pattern to perform the requested procedure.

Aspect 12: The method of aspect 11, wherein the switching pattern switches between the frequency ranges, the radio access technology types, the bandwidth parts, or a combination thereof in accordance with a switching duration.

Aspect 13: The method of aspect 12, further comprising: transmitting a capability of the UE to switch between the radio access technology types, the bandwidth parts, or a combination thereof, wherein the switching duration is based at least in part on the capability of the UE, the device, or both.

Aspect 14: The method of any of aspects 12 through 13, further comprising: receiving a message indicating the switching duration, the message being a radio resource control message, or a medium access control element message.

Aspect 15: The method of any of aspects 1 through 14, wherein receiving the indication of at least the frequency range further comprises: receiving a radio resource control message, or medium access control element message, of both comprising the indication of at least of the frequency range to be used for fulfilling the request.

Aspect 16: The method of any of aspects 1 through 15, wherein receiving the signal further comprises: receiving a first reference signal as part of a security key generation procedure pursuant to the request and the indicated frequency range, wherein the first reference signal is the signal: transmitting a second reference signal as part of the security key generation procedure; and determining a security key to be applied to one or more messages based at least in part on the first reference signal and the second reference signal.

Aspect 17: The method of any of aspects 1 through 16, wherein receiving the signal further comprises: receiving a charging signal as part of the energy transfer procedure pursuant to the request and the indicated frequency range; and harvesting the energy from the charging signal.

Aspect 18: The method of any of aspects 1 through 17, wherein the device is one of a base station or an additional UE.

Aspect 19: A method for wireless communications at a device, comprising: receiving a request from a UE in wireless communication with the device, the request being for the device to transmit a signal to the UE as part of an energy transfer procedure, a security key generation procedure, or both: transmitting, to the UE, an indication of at least a frequency range to be used for fulfilling the request; and transmitting the signal pursuant to the request and the indicated frequency range, the signal providing energy for the energy transfer procedure or being a basis for security key generation during the security key generation procedure.

Aspect 20: The method of aspect 19, further comprising: transmitting a message indicating a radio access technology type to be used for fulfilling the request, wherein the signal is transmitted pursuant to the radio access technology.

Aspect 21: The method of aspect 20, further comprising: receiving a capability message indicating one or more supported radio access technology types that the UE supports, wherein the radio access technology indicated by the message is one of the one or more supported radio access technology types.

Aspect 22: The method of any of aspects 20 through 21, further comprising: identifying an ordered list of radio access technology types, the ordered list of radio access technology types comprising a plurality of radio access technology types ordered based at least in part on an ability of each radio access technology type of the plurality of the radio access technology types to support the energy transfer procedure, the security key generation procedure, or both.

Aspect 23: The method of aspect 22, wherein transmitting the message indicating the radio access technology to be used for fulfilling the request further comprises: transmitting, in the message, an indication of one or more radio access technology types included in the ordered listed of radio access technology types associated with the security key generation procedure, or one or more radio access technology types included in the ordered listed of radio access technology types associated with the energy transfer procedure, or both; and determining the radio access technology type from the ordered list of radio access technology types to be used for fulfilling the request based at least on part on the requested procedure.

Aspect 24: The method of any of aspects 19 through 23, further comprising: determining a radio access technology type to be used for fulfilling the request based at least in part on availability of the indicated frequency range for different radio access technology types.

Aspect 25: The method of any of aspects 19 through 24, further comprising: transmitting a message indicating a bandwidth part to be used for fulfilling the request, the bandwidth part included in the frequency range; and transmitting the signal pursuant to the request and the bandwidth part, the signal providing energy for the energy transfer procedure or being the basis for security key generation during the security key generation procedure.

Aspect 26: The method of any of aspects 19 through 25, further comprising: receiving a capability message indicating one or more frequency ranges that the UE supports, wherein the indicated frequency range is one of the one or more supported frequency ranges.

Aspect 27: The method of any of aspects 19 through 26, further comprising: identifying an ordered list of frequency ranges, the ordered list of frequency ranges comprising a plurality of frequency ranges ordered based at least in part on an ability of each frequency range of the plurality of frequency ranges to support the energy transfer procedure, the security key generation procedure, or both.

Aspect 28: The method of aspect 27, wherein transmitting the indication of at least the frequency range further comprises: transmitting a message indicating a first set of frequency ranges included in the ordered list of frequency ranges associated with the security key generation procedure, or a second set of frequency ranges included in the ordered list of frequency ranges associated with the energy transfer procedure; and determining the frequency range from the ordered list of frequency ranges to be used for fulfilling the request based at least on part on the requested procedure.

Aspect 29: The method of any of aspects 19 through 28, further comprising: identifying a switching pattern, the switching pattern indicating a pattern for switching between frequency ranges, radio access technology types, bandwidth parts, or a combination thereof; and switching between the frequency ranges, the radio access technology types, the bandwidth parts, or a combination thereof, in accordance with the switching pattern to perform the requested procedure.

Aspect 30: An apparatus for wireless communications at a UE, comprising at least one processor: memory coupled with the at least one processor; and instructions stored in the memory and executable by the at least one processor to cause the apparatus to perform a method of any of aspects 1 through 18.

Aspect 31: An apparatus for wireless communications at a UE, comprising at least one means for performing a method of any of aspects 1 through 18.

Aspect 32: A non-transitory computer-readable medium storing code for wireless communications at a UE, the code comprising instructions executable by at least one processor to perform a method of any of aspects 1 through 18.

Aspect 33: An apparatus for wireless communications at a device, comprising at least one processor: memory coupled with the at least one processor; and instructions stored in the memory and executable by the at least one processor to cause the apparatus to perform a method of any of aspects 19 through 29.

Aspect 34: An apparatus for wireless communications at a device, comprising at least one means for performing a method of any of aspects 19 through 29.

Aspect 35: A non-transitory computer-readable medium storing code for wireless communications at a device, the code comprising instructions executable by at least one processor to perform a method of any of aspects 19 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., including a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone: B alone: C alone: A and B in combination: A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:
  at least one memory; and
  at least one processor coupled to the at least one memory, wherein the at least one processor is configured to:
    transmit a request to a device in wireless communication with the UE, the request being for the device to transmit a signal to the UE as part of an energy transfer procedure, a security key generation procedure, or both;
    receive, from the device, an indication of at least a frequency range to be used for fulfilling the request;

receive, from the device, a first message indicating a first radio access technology type to be used for fulfilling the request; and
    receive, from the device, the signal pursuant to the request and in accordance with the indicated frequency range and the first radio access technology type, the signal providing energy for the energy transfer procedure or being a basis for security key generation during the security key generation procedure.

2. The UE of claim 1, wherein the at least one processor is further configured to:
  transmit a capability message indicating one or more supported radio access technology types that the UE supports, wherein the first radio access technology type indicated by the first message is one of the one or more supported radio access technology types.

3. The UE of claim 1, wherein the at least one processor is further configured to:
  identify an ordered list of radio access technology types, the ordered list of radio access technology types comprising a plurality of radio access technology types ordered based at least in part on an ability of each radio access technology type of the plurality of the radio access technology types to support the energy transfer procedure, the security key generation procedure, or both.

4. The UE of claim 3, wherein, to receive the first message indicating the first radio access technology type to be used for fulfilling the request, the at least one processor is configured to:
  receive, in the first message, an indication of one or more radio access technology types included in the ordered list of radio access technology types associated with the security key generation procedure, or one or more radio access technology types included in the ordered listed of radio access technology types associated with the energy transfer procedure, or both; and
  determine the first radio access technology type from the ordered list of radio access technology types to be used for fulfilling the request based at least on part on the request being for the energy transfer procedure, the security key generation procedure, or both.

5. The UE of claim 1, wherein the first radio access technology type to be used for fulfilling the request is based at least in part on availability of the indicated frequency range for different radio access technology types.

6. The UE of claim 1, wherein the at least one processor is further configured to:
  receive a second message indicating a bandwidth part to be used for fulfilling the request, the bandwidth part included in the frequency range, wherein the signal is pursuant to the request and the bandwidth part.

7. The UE of claim 1, wherein the at least one processor is further configured to:
  transmit a capability message indicating one or more frequency ranges that the UE supports, wherein the indicated frequency range is one of the one or more frequency ranges supported by the UE.

8. The UE of claim 1, wherein the at least one processor is further configured to:
  identify an ordered list of frequency ranges, the ordered list of frequency ranges comprising a plurality of frequency ranges ordered based at least in part an ability of each frequency range of the plurality of frequency ranges to support the energy transfer procedure, the security key generation procedure, or both.

9. The UE of claim 8, wherein, to receive the indication of at least the frequency range, the at least one processor is configured to:

receive a second message indicating a first set of frequency ranges included in the ordered list of frequency ranges associated with the security key generation procedure, or a second set of frequency ranges included in the ordered list of frequency ranges associated with the energy transfer procedure; and determine the frequency range from the ordered list of frequency ranges to be used for fulfilling the request based at least on part on the request being for the energy transfer procedure, the security key generation procedure, or both.

10. The UE of claim 1, wherein the at least one processor is further configured to:

identify a switching pattern, the switching pattern indicating a pattern for switching between frequency ranges, radio access technology types, bandwidth parts, or a combination thereof; and switch between the frequency ranges, the radio access technology types, the bandwidth parts, or a combination thereof, in accordance with the switching pattern to perform the energy transfer procedure, the security key generation procedure, or both.

11. The UE of claim 10, wherein the switching pattern is switches between the frequency ranges, the radio access technology types, the bandwidth parts, or a combination thereof in accordance with a switching duration.

12. The UE of claim 11, wherein the at least one processor is further configured to:

transmit a capability of the UE to switch between the radio access technology types, the bandwidth parts, or a combination thereof, wherein the switching duration is based at least in part on the capability of the UE, the device, or both.

13. The UE of claim 11, wherein the at least one processor is further configured to:

receive a second message indicating the switching duration, the second message being a radio resource control message, or a medium access control element message.

14. The UE of claim 1, wherein, to receive the indication of at least the frequency range, the at least one processor is configured to:

receive a radio resource control message, or medium access control element message, or both comprising the indication of at least of the frequency range to be used for fulfilling the request.

15. The UE of claim 1, wherein, to receive the signal, the at least one processor is configured to:

receive a first reference signal as part of the security key generation procedure pursuant to the request, the indicated frequency range, and the first radio access technology type, wherein the first reference signal is the signal;

transmit a second reference signal as part of the security key generation procedure; and determine a security key to be applied to one or more messages based at least in part on the first reference signal and the second reference signal.

16. The UE of claim 1, wherein, to receive the signal, the at least one processor is configured to:

receive a charging signal as part of the energy transfer procedure pursuant to the request, the indicated frequency range, and the first radio access technology type; and harvest the energy from the charging signal.

17. A network entity for wireless communications, comprising:

at least one memory; and at least one processor coupled to the at least one memory, wherein the at least one processor is configured to:

receive a request from a user equipment (UE) in wireless communication with the device, the request being for the device to transmit a signal to the UE as part of an energy transfer procedure, a security key generation procedure, or both;

transmit, to the UE, an indication of at least a frequency range to be used for fulfilling the request;

transmit, to the UE, a first message indicating a first radio access technology type to be used for fulfilling the request; and transmit the signal pursuant to the request and in accordance with the indicated frequency range and the first radio access technology type, the signal providing energy for the energy transfer procedure or being a basis for security key generation during the security key generation procedure.

18. The network entity of claim 17, wherein the at least one processor is further configured to:

receive a capability message indicating one or more supported radio access technology types that the UE supports, wherein the first radio access technology type indicated by the first message is one of the one or more supported radio access technology types.

19. The network entity of claim 17, further comprising wherein the at least one processor is further configured to:

identify an ordered list of radio access technology types, the ordered list of radio access technology types comprising a plurality of radio access technology types ordered based at least in part on an ability of each radio access technology type of the plurality of the radio access technology types to support the energy transfer procedure, the security key generation procedure, or both.

20. The network entity of claim 19, wherein, to transmit the first message indicating the radio access technology to be used for fulfilling the request, the at least one processor is further configured to:

transmit, in the first message, an indication of one or more radio access technology types included in the ordered list of radio access technology types associated with the security key generation procedure, or one or more radio access technology types included in the ordered listed of radio access technology types associated with the energy transfer procedure, or both; and determine the radio access technology type from the ordered list of radio access technology types to be used for fulfilling the request based at least on part on the request being for the energy transfer procedure, the security key generation procedure, or both.

21. The network entity of claim 17, wherein the at least one processor is further configured to:

determine the first radio access technology type to be used for fulfilling the request based at least in part on availability of the indicated frequency range for different radio access technology types.

22. The network entity of claim 17, wherein the at least one processor is further configured to:

transmit a second message indicating a bandwidth part to be used for fulfilling the request, the bandwidth part included in the frequency range; and transmit the signal pursuant to the request and the bandwidth part, the signal providing energy for the energy transfer procedure or being the basis for security key generation during the security key generation procedure.

23. The network entity of claim 17, wherein the at least one processor is further configured to:

receive a capability message indicating one or more frequency ranges that the UE supports, wherein the indicated frequency range is one of the one or more supported frequency ranges.

24. The network entity of claim 17, wherein the at least one processor is further configured to:

identify an ordered list of frequency ranges, the ordered list of frequency ranges comprising a plurality of frequency ranges ordered based at least in part an ability of each frequency range of the plurality of frequency ranges to support the energy transfer procedure, the security key generation procedure, or both.

25. The network entity of claim 24, wherein, to transmit the indication of at least the frequency range, the at least one processor is configured to:

transmit a second message indicating a first set of frequency ranges included in the ordered list of frequency ranges associated with the security key generation procedure, or a second set of frequency ranges included in the ordered list of frequency ranges associated with the energy transfer procedure; and determine the frequency range from the ordered list of frequency ranges to be used for fulfilling the request based at least on part on the request being for the energy transfer procedure, the security key generation procedure, or both.

26. The network entity of claim 17, wherein the at least one processor is further configured to:

identify a switching pattern, the switching pattern indicating a pattern for switching between frequency ranges, radio access technology types, bandwidth parts, or a combination thereof; and switch between the frequency ranges, the radio access technology types, the bandwidth parts, or a combination thereof, in accordance with the switching pattern to perform the energy transfer procedure, the security key generation procedure, or both.

27. A method for wireless communications at a user equipment (UE), comprising:

transmitting a request to a device in wireless communication with the UE, the request being for the device to transmit a signal to the UE as part of an energy transfer procedure, a security key generation procedure, or both;

receiving, from the device, an indication of at least a frequency range to be used for fulfilling the request;

receiving, from the device, a first message indicating a first radio access technology type to be used for fulfilling the request;

receiving, from the device, the signal pursuant to the request and in accordance with the indicated frequency range and the first radio access technology type, the signal providing energy for the energy transfer procedure or being a basis for security key generation during the security key generation procedure.

28. The method of claim 27, further comprising:

transmitting a capability message indicating one or more supported radio access technology types that the UE supports, wherein the first radio access technology type indicated by the first message is one of the one or more supported radio access technology types.

29. The method of claim 27, further comprising:

identifying an ordered list of radio access technology types, the ordered list of radio access technology types comprising a plurality of radio access technology types ordered based at least in part on an ability of each radio access technology type of the plurality of the radio access technology types to support the energy transfer procedure, the security key generation procedure, or both.

30. A method for wireless communications at a device, comprising:

receiving a request from a user equipment (UE) in wireless communication with the device, the request being for the device to transmit a signal to the UE as part of an energy transfer procedure, a security key generation procedure, or both;

transmitting, to the UE, an indication of at least a frequency range to be used for fulfilling the request;

transmitting, to the UE, a first message indicating a first radio access technology type to be used for fulfilling the request; and transmitting the signal pursuant to the request and in accordance with the indicated frequency range and the first radio access technology type, the signal providing energy for the energy transfer procedure or being a basis for security key generation during the security key generation procedure.

* * * * *